US012743319B2

(12) United States Patent
Hasti et al.

(10) Patent No.: US 12,743,319 B2
(45) Date of Patent: *Sep. 22, 2026

(54) DISTRIBUTED CONTROL PLANE FOR REFORMATTING COMMUNICATION BETWEEN A CONTAINER ORCHESTRATION PLATFORM AND A DISTRIBUTED STORAGE ARCHITECTURE

(71) Applicant: NetApp Inc., San Jose, CA (US)

(72) Inventors: Praveen Kumar Hasti, Acton, MA (US); Christopher Alan Busick, Littleton, MA (US)

(73) Assignee: NetApp, Inc., San Jose, CA (US)

( * ) Notice: Subject to any disclaimer, the term of this patent is extended or adjusted under 35 U.S.C. 154(b) by 1044 days.

This patent is subject to a terminal disclaimer.

(21) Appl. No.: 17/718,382

(22) Filed: Apr. 12, 2022

(65) Prior Publication Data

US 2023/0325253 A1 Oct. 12, 2023

(51) Int. Cl.
*G06F 9/50* (2006.01)
*G06F 3/06* (2006.01)
(Continued)

(52) U.S. Cl.
CPC .......... *G06F 9/5072* (2013.01); *G06F 3/0607* (2013.01); *G06F 3/0658* (2013.01); (Continued)

(58) Field of Classification Search
None
See application file for complete search history.

(56) References Cited

U.S. PATENT DOCUMENTS 8,762,547 B2 6/2014 Stanev
9,438,665 B1 9/2016 Vasanth et al.
(Continued)

FOREIGN PATENT DOCUMENTS

EP 3792760 A1 3/2021
KR 20200108228 A 9/2020

OTHER PUBLICATIONS

Corrected Notice of Allowance mailed on May 22, 2025 for U.S. Appl. No. 18/479,195, filed Oct. 2, 2023, 05 pages.
(Continued)

*Primary Examiner* — Zujia Xu
(74) *Attorney, Agent, or Firm* — Cooper Legal Group, LLC

(57) ABSTRACT

Techniques are provided for implementing a distributed control plane to facilitate communication between a container orchestration platform and a distributed storage architecture. The distributed storage architecture hosts worker nodes that manage distributed storage that can be made accessible to applications within the container orchestration platform through the distributed control plane. However, the worker nodes may support an imperative model of program commands, but the container orchestration platform and applications therein utilize a declarative model of programming commands not supported by the distributed storage architecture. Accordingly, the distributed control plane is configured with control plane controllers that are paired with the worker nodes and are configured to reformat commands between the imperative model and the declarative model. In this way, the control plane controllers can facilitate communication and performance of commands between the applications of the container orchestration platform and the worker nodes of the distributed storage architecture.

20 Claims, 21 Drawing Sheets

(51) Int. Cl.
*G06F 9/30* (2018.01)
*G06F 9/38* (2018.01)

(52) U.S. Cl.
CPC .......... *G06F 3/067* (2013.01); *G06F 9/30174* (2013.01); *G06F 9/3836* (2013.01)

(56) References Cited

U.S. PATENT DOCUMENTS

| | | | | |
|---|---|---|---|---|
| 10,871,922 | B2 | 12/2020 | East | |
| 11,245,748 | B1 | 2/2022 | Hannon | |
| 11,283,690 | B1 * | 3/2022 | Mosier | H04L 41/22 |
| 11,416,312 | B1 * | 8/2022 | Liu | G06F 9/5061 |
| 11,650,886 | B2 | 5/2023 | Mathew et al. | |
| 11,706,106 | B2 * | 7/2023 | Verma | H04L 41/5054 709/224 |
| 11,748,030 | B1 | 9/2023 | East | |
| 11,822,370 | B2 | 11/2023 | Patel et al. | |
| 12,321,790 | B2 | 6/2025 | Hasti et al. | |
| 12,423,021 | B2 | 9/2025 | Hasti et al. | |
| 2013/0067163 | A1 * | 3/2013 | Velayudhan | G06F 3/067 711/E12.001 |
| 2015/0154011 | A1 * | 6/2015 | Ceng | G06F 8/51 717/137 |
| 2015/0169436 | A1 * | 6/2015 | Tamilmani | G06F 11/3696 717/124 |
| 2017/0123657 | A1 * | 5/2017 | B | G06F 3/065 |
| 2018/0007060 | A1 * | 1/2018 | Leblang | H04L 63/107 |
| 2019/0065096 | A1 | 2/2019 | Sterin et al. | |
| 2019/0102239 | A1 | 4/2019 | Caldato et al. | |
| 2019/0173793 | A1 | 6/2019 | Liu et al. | |
| 2019/0334918 | A1 * | 10/2019 | AbiEzzi | H04L 63/0281 |
| 2020/0026625 | A1 | 1/2020 | Konka et al. | |
| 2020/0083909 | A1 | 3/2020 | Kusters et al. | |
| 2020/0099610 | A1 | 3/2020 | Heron et al. | |
| 2020/0104275 | A1 | 4/2020 | Sen et al. | |
| 2020/0213879 | A1 | 7/2020 | Kim et al. | |
| 2020/0280592 | A1 | 9/2020 | Ithal et al. | |
| 2020/0348863 | A1 | 11/2020 | Venkatesan et al. | |
| 2021/0034423 | A1 | 2/2021 | Hallur et al. | |
| 2021/0311764 | A1 | 10/2021 | Rosoff et al. | |
| 2021/0349767 | A1 | 11/2021 | Asayag et al. | |
| 2022/0012095 | A1 | 1/2022 | Ylinen et al. | |
| 2022/0391138 | A1 | 12/2022 | Dronamraju et al. | |
| 2023/0089662 | A1 * | 3/2023 | Wang | G06F 9/5072 707/827 |
| 2023/0121460 | A1 | 4/2023 | Banerjee et al. | |
| 2023/0289228 | A1 * | 9/2023 | Chintha | G06F 9/5061 |
| 2023/0325118 | A1 | 10/2023 | Hasti et al. | |
| 2024/0028255 | A1 | 1/2024 | Hasti et al. | |
| 2024/0036770 | A1 | 2/2024 | Hasti et al. | |
| 2024/0419362 | A1 | 12/2024 | Hasti et al. | |
| 2025/0291643 | A1 | 9/2025 | Hasti et al. | |
| 2025/0377826 | A1 | 12/2025 | Hasti et al. | |

OTHER PUBLICATIONS

Notice of Allowance mailed on May 7, 2024 for U.S. Appl. No. 18/487,366, filed Oct. 16, 2023, 08 pages.
U.S. Appl. No. 17/718,395, filed Apr. 12, 2022, Hasti et al.
U.S. Appl. No. 17/718,403, filed Apr. 12, 2022, Hasti et al.
U.S. Appl. No. 17/718,419, filed Apr. 12, 2022, Hasti et al.
Notice of Allowance mailed on May 5, 2025 for U.S. Appl. No. 17/718,419, filed Apr. 12, 2022, 02 pages.
Notice of Allowance mailed on Jun. 7, 2023 for U.S. Appl. No. 17/718,403, filed Apr. 12, 2022, 7 pages.
Notice of Allowance mailed on May 24, 2023 for U.S. Appl. No. 17/718,395, filed Apr. 12, 2022, 8 pages.
Alibaba Cloud; Distributed Cloud Container Platform for Kubernetes (ACK One); 8 Pgs.
Google; GKE cluster architecture; 5 Pgs.
International Search Report cited in PCT/US2023/065353, mailed Jul. 13, 2023, 14 pages.
Notice of Allowance mailed on Aug. 2, 2023 for U.S. Appl. No. 17/718,403, filed Apr. 12, 2022, 04 pages.
Co-pending U.S. Appl. No. 17/718,395, inventors Praveen; Kumar Hasti et al., filed Apr. 12, 2022.
Co-pending U.S. Appl. No. 17/718,403, inventors Praveen; Kumar Hasti et al., filed Apr. 12, 2022.
Co-pending U.S. Appl. No. 17/718,419, inventors Praveen; Kumar Hasti et al., filed Apr. 12, 2022.
Notice of Allowance mailed on Apr. 14, 2023 for U.S. Appl. No. 17/718,403, filed Apr. 12, 2022, 7 pages.
Non-Final Office Action mailed on Feb. 12, 2025 for U.S. Appl. No. 18/479,195, filed Oct. 2, 2023, 8 pages.
Notice of Allowance mailed Aug. 14, 2023 for U.S. Appl. No. 17/718,395, filed Apr. 12, 2022, 05 pages.
Notice of Allowance mailed Aug. 18, 2023 for U.S. Appl. No. 17/718,403, filed Apr. 12, 2022, 04 pages.
Notice of Allowance malled on Aug. 30, 2023 for U.S. Appl. No. 17/718,395, filed Apr. 12, 2022, 5 pages.
International Preliminary Report on Patentability for Application No. PCT/US2023/065353 mailed on Oct. 24, 2024, 09 pages.
Non-Final Office Action mailed on Sep. 18, 2024 for U.S. Appl. No. 17/718,419, filed Apr. 12, 2022, 09 pages.
European Office Action for Application No. EP23720516 dated on Aug. 6, 2025, 12 pages.
Notice of Allowance mailed on Mar. 5, 2025 for U.S. Appl. No. 17/718,419, filed Apr. 12, 2022, 02 pages.
Notice of Allowance mailed on Apr. 15, 2025 for U.S. Appl. No. 18/479,195, filed Oct. 2, 2023, 08 pages.
"Google Kubernetes Engine: Ultimate Quick Start Guide", Jun. 2021, Cloud Central, Kubernetes Storage, Reprinted from the Internet at: https://cloud.netapp.com/blog/gcp-cvo-blg-google-kubernetes-engine-ultimate-quick-start-guide, 9 pgs.
"Kubernetes Autoscaling: 3 Methods and How to Make Them Great", Jan. 2022, Spot by NetApp, Reprinted from the Internet at: https://spot.io/resources/kubernetes-autoscaling-3-methods-and-how-to-make-them-great/, 10 pgs.
"Use Cases", 2022, NetApp Cloud Volumes Service for Google Cloud, Cloud Architecture Center, Reprinted from the Internet at: https://cloud.google.com/architecture/partners/netapp-cloud-volumes/use-cases#:~:text=Cloud%20Volumes%20Service%20expedites%20the,analytics%2C%20DevOps%2C%20and%20databases. 4 pgs.
"Using the Kubernetes Vertical Pod Autoscaler", Oracle cloud Infrastructure Documentation, Reprinted from the Internet at: https://docs.oracle.com/en-us/iaas/Content/ContEng/Tasks/contengusingverticalpodautoscaler.htm, 9 pgs.
"Vertical Autoscaling in Kubernetes", May 2021, Pua Abbassi, Giant Swarm, Reprinted from the Internet at: https://docs.oracle.com/en-us/iaas/Content/ContEng/Tasks/contengusingverticalpodautoscaler.htm, 10 pgs.
"Vertical Pod Autoscaler", Amazon EKS User Guide, Reprinted from the Internet at: https://docs.aws.amazon.com/eks/latest/userguide/vertical-pod-autoscaler.html, 5 pgs.
"Vertical Pod Autoscaling", Kubernetes Engine Documentation, Google Cloud, Reprinted from the Internet at: https://docs.aws.amazon.com/eks/latest/userguide/vertical-pod-autoscaler.html, 9 pgs.
"What Can NetApp's Cloud Volumes Services Do?", Volta, Reprinted from the Internet at: https://voltainc.com/cloud-volumes-services/, 3 pgs.
Non-Final Office Action mailed on Jan. 7, 2026 for U.S. Appl. No. 18/821,356, filed Aug. 30, 2024, 08 pages.
Corrected Notice of Allowance mailed on Aug. 26, 2025 for U.S. Appl. No. 18/479,195, filed Oct. 2, 2023, 05 pages.
Notice of Allowance mailed on Apr. 28, 2026 for U.S. Appl. No. 18/821,356, filed Aug. 30, 2024, 07 pages.

* cited by examiner

Figure 4:
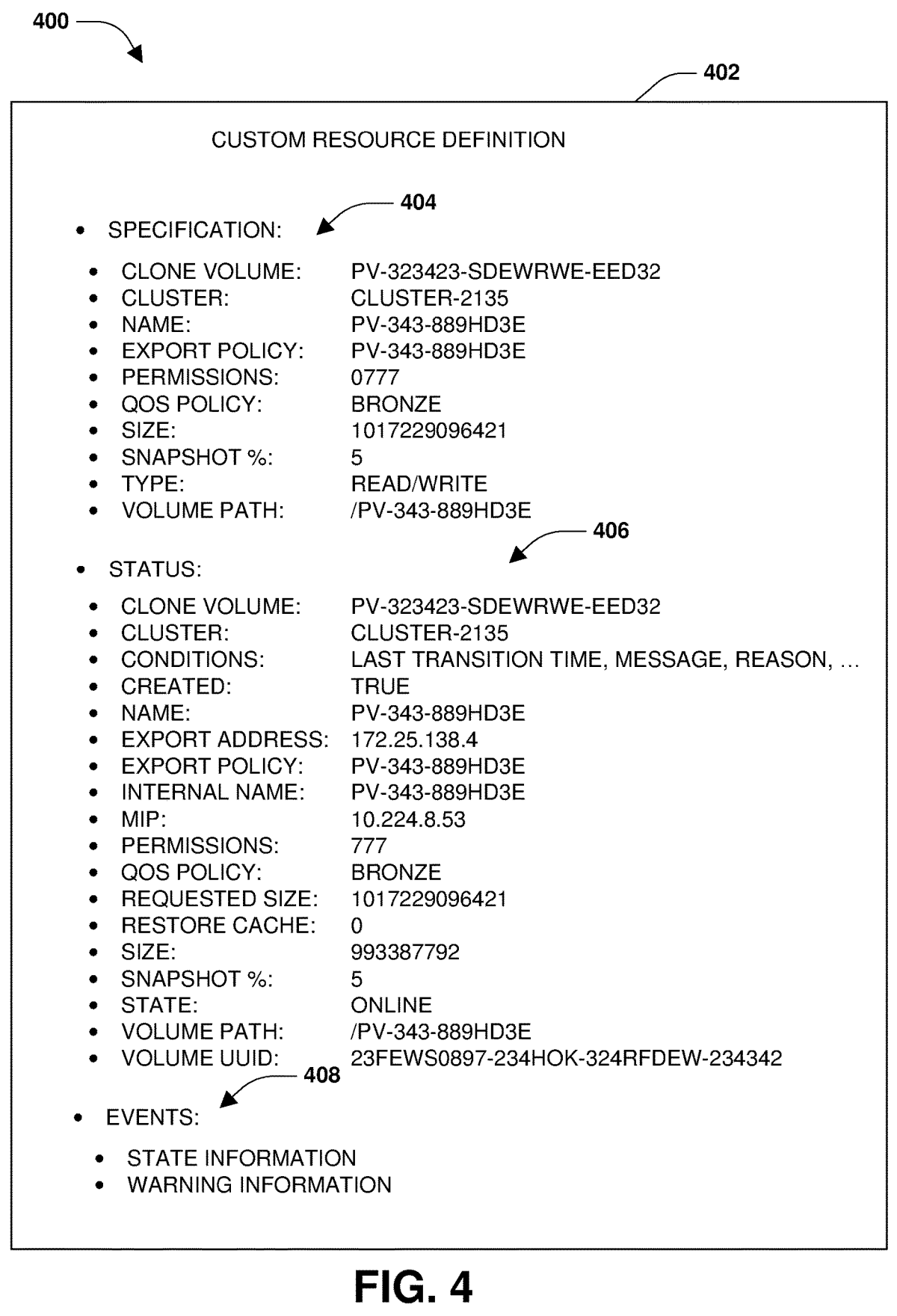

400

402

CUSTOM RESOURCE DEFINITION

404

- SPECIFICATION:
  - CLONE VOLUME: PV-323423-SDEWRWE-EED32
  - CLUSTER: CLUSTER-2135
  - NAME: PV-343-889HD3E
  - EXPORT POLICY: PV-343-889HD3E
  - PERMISSIONS: 0777
  - QOS POLICY: BRONZE
  - SIZE: 1017229096421
  - SNAPSHOT %: 5
  - TYPE: READ/WRITE
  - VOLUME PATH: /PV-343-889HD3E

406

- STATUS:
  - CLONE VOLUME: PV-323423-SDEWRWE-EED32
  - CLUSTER: CLUSTER-2135
  - CONDITIONS: LAST TRANSITION TIME, MESSAGE, REASON, ...
  - CREATED: TRUE
  - NAME: PV-343-889HD3E
  - EXPORT ADDRESS: 172.25.138.4
  - EXPORT POLICY: PV-343-889HD3E
  - INTERNAL NAME: PV-343-889HD3E
  - MIP: 10.224.8.53
  - PERMISSIONS: 777
  - QOS POLICY: BRONZE
  - REQUESTED SIZE: 1017229096421
  - RESTORE CACHE: 0
  - SIZE: 993387792
  - SNAPSHOT %: 5
  - STATE: ONLINE
  - VOLUME PATH: /PV-343-889HD3E
  - VOLUME UUID: 23FEWS0897-234HOK-324RFDEW-234342

408

- EVENTS:
  - STATE INFORMATION
  - WARNING INFORMATION

1002 RECEIVE COMMAND TO PERFORM OPERATION ASSOCIATED WITH OBJECT STORED WITHIN DISTRIBUTED STORAGE ARCHITECTURE

1004 HAS WORKER NODE OWNING OBJECT FAILED?

NO

1006 ROUTE COMMAND TO CONTROL PLANE CONTROLLER PAIRED WITH WORKER NODE OWNING OBJECT

1008 REFORMAT COMMAND ACCORDING TO IMPERATIVE MODEL SUPPORTED BY DISTRIBUTED STORAGE ARCHITECTURE

1010 TRANSMIT REFORMATTED COMMAND TO API ENDPOINT OF WORKER NODE FOR IMPLEMENTATION

YES

1012 TRANSFER OWNERSHIP OF OBJECT TO REPLACEMENT WORKER NODE

1014 IDENTIFY OR PAIR CONTROL PLANE CONTROLLER WITH REPLACEMENT WORKER NODE

1016 ROUTE COMMAND TO CONTROL PLANE CONTROLLER PAIRED WITH REPLACEMENT WORKER NODE OWNING OBJECT

1018 REFORMAT AND TRANSMIT REFORMATTED COMMAND TO API ENDPOINT OF REPLACEMENT WORKER NODE FOR IMPLEMENTATION

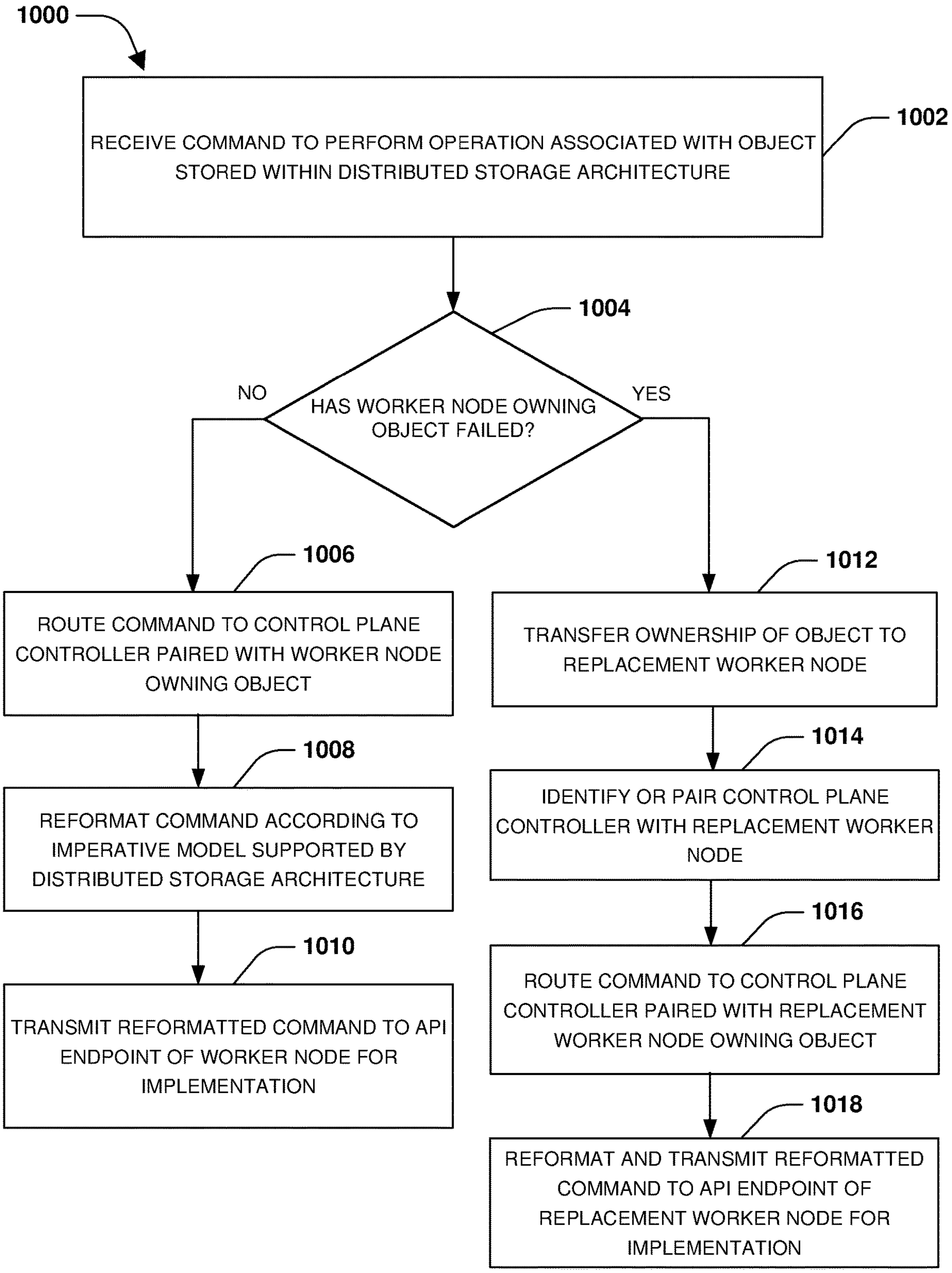

102
CONTAINER ORCHESTRATION PLATFORM
104
CONTAINER (1)
106
APPLICATION (1)
108
CONTAINER (2)
110
APPLICATION (2)
OWNERSHIP INFO
602
304
DISTRIBUTED DATABASE OF CUSTOM RESOURCE DEFINITIONS
128
DISTRIBUTED CONTROL PLANE
901
POLLING THREAD
130
POD (1)
CONTROL PLANE CONTROLLER (1)
132
POD (2)
CONTROL PLANE CONTROLLER (2)
134
POD (3)
CONTROL PLANE CONTROLLER (3)
136
138
140

900

102

CONTAINER ORCHESTRATION PLATFORM

104

CONTAINER (1)

106

APPLICATION (1)

108

CONTAINER (2)

110

APPLICATION (2)

OWNERSHIP INFO

602

304

DISTRIBUTED DATABASE OF CUSTOM RESOURCE DEFINITIONS

128

DISTRIBUTED CONTROL PLANE

901

POLLING THREAD

130

POD (1)

CONTROL PLANE CONTROLLER (1)

132

POD (2)

CONTROL PLANE CONTROLLER (2)

134

POD (3)

CONTROL PLANE CONTROLLER (3)

136

138

140

DISTRIBUTED CONTROL PLANE FOR REFORMATTING COMMUNICATION BETWEEN A CONTAINER ORCHESTRATION PLATFORM AND A DISTRIBUTED STORAGE ARCHITECTURE

TECHNICAL FIELD

Various embodiments of the present technology relate to a distributed control plane. More specifically, some embodiments relate to facilitating communication between a container orchestration platform and a distributed storage architecture using the distributed control plane.

BACKGROUND

Historically, developers have built applications designed to be run on a single platform. This makes resource allocation and program execution simple and straight forward. For example, an application may be hosted on a server, and thus the application may utilize memory, storage, and processor resources of the server. The application may be defined using a particular programming language and paradigm/model supported by the server. However, building and deploying these types of applications is no longer desirable in most instances as many modern applications often need to efficiently and securely scale (potentially across multiple platforms) based on demand. There are many options for developing scalable, modern applications. Examples include, but are not limited to, virtual machines, microservices, and containers. The choice often depends on a variety of factors such as the type of workload, available ecosystem resources, need for automated scaling, compatible programming language and paradigm/model, and/or execution preferences.

When developers select a containerized approach for creating scalable applications, portions (e.g., microservices, larger services, etc.) of the application are packaged into containers. Each container may comprise software code, binaries, system libraries, dependencies, system tools, and/or any other components or settings needed to execute the application according to a particular model such as a declarative model of programming. In this way, the container is a self-contained execution enclosure for executing that portion of the application.

Unlike virtual machines, containers do not include operating system images. Instead, containers ride on a host operating system which is often light weight allowing for faster boot and utilization of less memory than a virtual machine. The containers can be individually replicated and scaled to accommodate demand. Management of the container (e.g., scaling, deployment, upgrading, health monitoring, etc.) is often automated by a container orchestration platform (e.g., Kubernetes).

The container orchestration platform can deploy containers on nodes (e.g., a virtual machine, physical hardware, etc.) that have allocated compute resources (e.g., processor, memory, etc.) for executing applications hosted within containers. Applications (or processes) hosted within multiple containers may interact with one another and cooperate together. For example, a storage application within a container may access a deduplication application and an encryption application within other containers in order deduplicate and/or encrypt data managed by the storage application. Container orchestration platforms often offer the ability to support these cooperating applications (or processes) as a grouping (e.g., in Kubernetes this is referred to as a pod).

This grouping (e.g., a pod) can supports multiple containers and forms a cohesive unit of service for the applications (or services) hosted within the containers. Containers that are part of a pod may be co-located and scheduled on a same node, such as the same physical hardware or virtual machine. This allows the containers to share resources and dependencies, communicate with one another, and/or coordinate their lifecycles of how and when the containers are terminated.

DESCRIPTION OF THE DRAWINGS

Embodiments of the present technology will be described and explained through the use of the accompanying drawings in which:

FIG. 4 is an example of a custom resource definition in accordance with an embodiment of the present technology.

FIG. 10 is a flow chart illustrating an example of a set of operations that route commands to control plane controllers paired with worker nodes based upon whether the worker nodes are operational or have failed in accordance with various embodiments of the present technology.

Figure 1A:
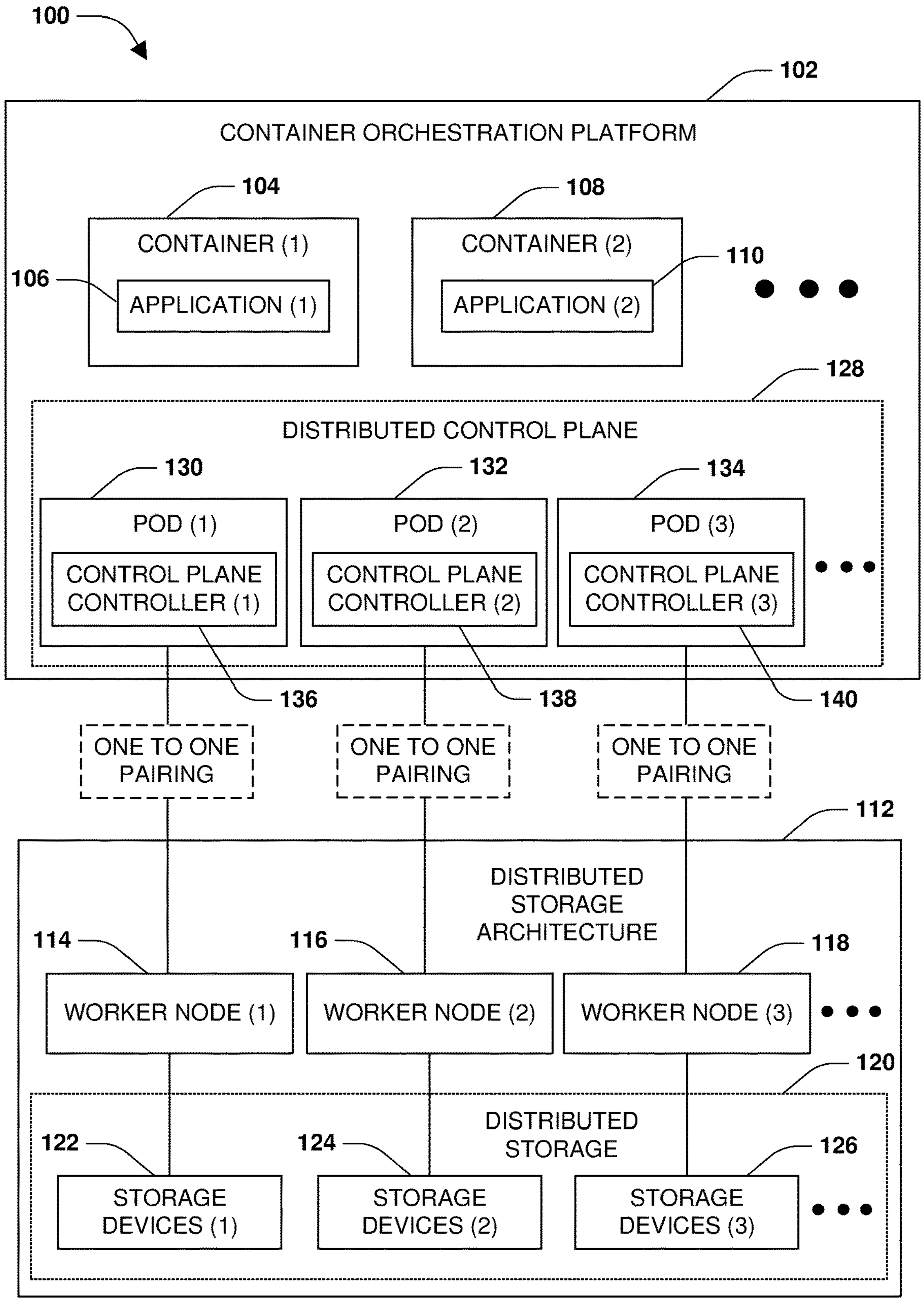
FIG. 1A is a block diagram illustrating an example of a distributed control plane of control plane controllers paired with worker nodes in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

The techniques described herein are directed to implementing a distributed control plane to facilitate communication between a container orchestration platform and a distributed storage architecture. The demands on data center infrastructure and storage are changing as more and more data centers are transforming into private and hybrid clouds. Storage solution customers are looking for solutions that can provide automated deployment and lifecycle management, scaling on-demand, higher levels of resiliency with increased scale, and automatic failure detection and self-healing. To meet these objectives, a container-based distributed storage architecture can be leveraged to create a composable, service-based architecture that provides scalability, resiliency, and load balancing. The container-based distributed storage architecture may provide a scalable, resilient, software defined architecture that can be leveraged to be the data plane for existing as well as new web scale applications. The container-based distributed storage architecture may include a container orchestration platform (e.g., Kubernetes).

Applications may be deployed as containers within the container orchestration platform in a scalable and on-demand manner. For example, a file system service application may be hosted within a container that is managed by the container orchestration platform. The file system service application may be accessed by clients in order to store and retrieve data managed by the file system service application, such as through a volume. In order to provide these applications hosted by the container orchestration platform with physical storage, a distributed storage architecture is provided.

The distributed storage architecture may be hosted separate from and external to the container orchestration platform. This provides the ability to tailor and configure the distributed storage architecture to manage distribute storage in an efficient manner that can be made accessible to any type of computing environment, such as the applications hosted within the container orchestration platform, applications and services hosted on servers or on-prem, applications and services hosted within various types of cloud computing environments, etc. Accordingly, the distributed storage architecture is composed of worker nodes that are configured to manage the distributed storage. Each worker node may manage one or more storage devices, such as locally attached storage. In this way, the storage devices of the worker nodes may form the distributed storage. Data may be slice/distributed and/or redundantly stored across storage devices of multiple worker nodes, which may improve resilience to failures and/or enable more efficient load balancing. This is because a particular worker node may be assigned to be an owner of an object, such as a volume, stored across storage devices of multiple worker node. If the work node fails, then ownership of the object can be reassigned to another worker node for managing and providing access to the object. Ownership of objects may be dynamically changed between worker nodes without physically migrating the data of the objects.

The distributed storage architecture implements and hosts the worker nodes that manage the distributed storage, which may be used by applications and services external to the distributed storage architecture for storing data. In some embodiments, volumes may be created within the distributed storage of the distributed storage architecture. The applications hosted within the containers of the container orchestration platform may mount to these volumes so that the applications can store data within the volumes. Control plane logic can be implemented to manage volume operations that are performed upon the volumes stored by the worker nodes within the distributed storage of the distributed storage architecture. These volume operations may correspond to volume creation operations, volume deletion operations, file creation operations, volume snapshot creation operations, backup and restore operations, and/or other operations. The control plane logic acts as an intermediary layer that facilitates, tracks, and manages worker nodes executing control plane operations requested by the applications hosted within the containers in the container orchestration platform, such as the creation of a volume within the distributed storage for use by an application.

Traditionally, the control plane logic may be hosted external to the container orchestration environment, and thus is unable to leverage management functionality, job scheduling services, APIs, resources, and/or other functionality and services provided by the container orchestration environment for applications hosted within the container orchestration environment. In order to incorporate and host the control plane logic into the container orchestration environment, the control plane logic could be hosted within a single control plane controller hosted within a container of the container orchestration environment. In this way, various features provided by the container orchestration environment for containers can be provided for the single control plane controller, such as job scheduling, dynamic resource allocation/scaling, etc. Thus, the single control plane controller is a single centralized controller for taking control and orchestrating all of the control plane operations requested by the applications of the container orchestration environment for execution by the worker nodes of the distributed storage environment. However, this solution of a single control plane controller is unable to scale out to situations where each worker node may host thousands of volumes, and there could be hundreds of worker nodes at any given moment. That is, a single control plane controller cannot scale out to manage volume operations and other control plane operations for hundreds of worker nodes each hosting hundreds to thousands of volumes. Additionally, the single control plane controller would be a single point of failure. If the single control plane controller or the container hosting the single control plane controller crashes, then no volume level operations and/or other types of control plane operations handled by the single control plane controller could be performed. Thus, if an application is attempting to create a volume for storing data, then the application would be unable to have the volume created, which could cause the application to error out or cause other problems.

Another issue with facilitating communication between the container orchestration platform and the distributed storage architecture is that the container orchestration platform and the distributed storage architecture may utilize different models for defining and implementing programming commands. In some embodiments, the container orchestration platform (e.g., Kubernetes) may implement a declarative model (a declarative programming model). With the declarative model, an application hosted within a container in the container orchestration platform can describe a result without explicitly listing instructions, programming commands, or executable steps to achieve the result. In some embodiments, an application may request the provisioning of a volume to use for storage. The request describes the volume, such as a name, size, and/or other attributes that the volume should have. However, the request does not comprise the programming commands or executable steps to actually create the volume. In contrast, the distributed storage architecture may implement an imperative model (an imperative programming model). With the imperative model, a worker node expects and operates based upon programming commands or executable steps (e.g., statements that change a program's state) that are provided to the worker node to execute in order to accomplish a particular result. In some embodiments, the worker node expects and is capable of executing a particular sequence of programming commands or executable steps to create the volume. However, the worker node is unable perform to the request, defined by the application accordingly to the declarative model, because these requests do not contain the required programming commands or executable steps that the worker node needs in order to create the volume.

Another issue with the control plane logic facilitating communication between the container orchestration platform and the distributed storage architecture is the dynamic nature of the distributed storage architecture. The distributed storage architecture data of a volume may be sliced/distributed across storage devices of multiple worker nodes. At any given point of there, there may be a single owner of the volume. Ownership of the volume can dynamically change amongst worker nodes such as for load balancing or failover reasons. Traditional control plane logic does not understand this fluidity of volume ownership where ownership of a volume or other type of object can change even without migrating data of the volume to the new owner. Thus, the traditional control plane logic is unable to handle volume ownership changes and/or failover scenarios.

Accordingly, as provided herein, a distributed control plane is configured to facilitate communication between the container orchestration platform and the distributed storage architecture in a manner that addresses the aforementioned issues and deficiencies of traditional control plane logic. The distributed control plane is hosted within the container orchestration platform so that the distributed control plane can leverage communication, job scheduling, dynamic resource allocation/scaling, containers, and/or other resources and services provided by the container orchestration platform. At any given point in time, the distributed control plane may comprise any number of control plane controllers that are hosted within pods of the container orchestration platform (e.g., the number of controller plane controllers may be dynamically scaled up or down based upon demand). In some embodiments, each control plane controller is paired with a single worker node. This distributed aspect of the distributed control plane where multiple control plane controllers may be utilized solves scaling and single point of failure issues that would otherwise arise if a single control plane controller was used. Any number of control plane controllers can be created and/or paired with worker nodes on-demand in a scale-out manner. Thus, if one of the control plane controllers fails, then a new control plane controller or an existing control plane controller can take over for the failed control plane controller. In some embodiments, any number of control plane controllers may be paired with any number of worker nodes.

The control plane controllers are configured with functionality that can reformat/convert commands formatted according to the declarative model supported by the container orchestration platform into reformatted commands formatted according to the imperative model supported by the distributed storage architecture, and vice versa. In some embodiments, a volume provisioning command may be created by an application within the container orchestration platform by defining a custom resource definition for a volume to be provisioned. The custom resource definition is formatted according to the declarative model where attributes of the volume are defined within the custom resource definition, but the custom resource definition does not comprise the actual programming commands or executable steps that a worker node would need to execute in order to actually provision the volume. Accordingly, a control plane controller is configured with functionality capable of retrieving the attributes from the custom resource definition and utilizing those attributes to construct a reformatted command with programming commands or executable steps that the worker node can execute to provision the volume with those attributes. This solves issues where the container orchestration platform and the distributed storage architecture utilize different programming models.

The distributed control plane is configured with functionality that can track the ownership of objects, such as volumes, by worker nodes. That is, an object may be owned by a single worker node at any given point in time. However, data of the object may be stored across storage devices of multiple worker nodes. The distributed storage architecture may change ownership of the object amongst worker nodes for various reasons, such as for load balancing or failover. When a command from an application targets a particular object, then the command is to be routed to the worker node owning that object. Configuring the distributed control plane with the functionality that can track the ownership of objects solves issues otherwise occurring when ownership of an object changes to a different worker node, and thus commands (reformatted commands) targeting the object must be routed to this different worker node. In some embodiments, ownership information maintained by the distributed storage architecture queried using an identifier of an object to determine that the identifier of the object is paired with an identifier of a worker node.

The distributed control plane is configured with functionality that can detect worker node failures, addition of new worker nodes, and/or removal of worker nodes. The ability to track when and how the distributed storage architecture adds worker nodes, removes worker nodes, or reacts to worker node failures allows the distributed control plane to react accordingly. In some embodiments, if the distributed control plane detects that that distributed storage architecture replaces a failed worker node with a new worker node, then the distributed control plane may reassign a control plane controller paired with the failed worker node to being paired with the new worker node or may remove the control plane controller and create a new control plane controller paired with the new worker node. In this way, the distributed control plane can react to failures within the distributed storage architecture and/or dynamically scale up/down based upon the number worker nodes currently operating within the distributed storage architecture.

Various embodiments of the present technology provide for a wide range of technical effects, advantages, and/or improvements to computing systems and components. For example, various embodiments may include one or more of the following technical effects, advantages, and/or improvements: 1) a non-routine and unconventional distributed control plane of control plane controllers that facilitate communication between a container orchestration environment and a distributed storage architecture; 2) pairing the control plane controllers with worker nodes of the distributed storage architecture in a scalable manner with no single point of failure; 3) configuring the control plane controllers with functionality that can reformat/convert commands formatted according to the declarative model supported by the container orchestration platform into reformatted commands formatted according to the imperative model supported by the distributed storage architecture, and vice versa; 4) configuring the distributed control plane with functionality that can track object ownership changes so that commands can be dynamically routed to control plane controllers paired with worker nodes that are current owners of objects targeted by the commands; and/or 5) configuring the distributed control plane with functionality that can detect worker node failures, addition of new worker nodes, and/or removal of worker nodes so that the distributed control plane can react to failures within the distributed storage architecture and/or dynamically scale up/down based upon the number worker nodes currently operating within the distributed storage architecture.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to container orchestration platforms (e.g., Kubernetes) and distributed storage architectures, embodiments of the present technology are equally applicable to various other types of hardware, software, and/or storage environments.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1A is a block diagram illustrating an example of a distributed control plane of control plane controllers paired with worker nodes in accordance with an embodiment of the present technology. A container orchestration platform 102, such as Kubernetes, may be configured to deploy containers on nodes (e.g., a virtual machine, physical hardware, etc.) that have allocated compute resources (e.g., processor, memory, etc.) for executing applications hosted within the containers. In some embodiments, a first application 106 may be hosted within a first container 104, a second application 110 may be hosted within a second container 108, etc. The container orchestration platform 102 may support a declarative model (a declarative programming model) of programming code. Accordingly, the applications hosted within the containers of the container orchestration platform 102 may generate commands formatted according to the declarative model. In some embodiments, the applications may generate commands to perform control plane operations, such as volume create and delete operations, file create operations, snapshot operations, backup and restore operations, or other volume operations according to the declarative model. In some embodiments, the first application 106 may generate a snapshot command to create a snapshot. The snapshot command may specify attributes of the snapshot, but does not include programming instructions or executable steps that can be executed to create the snapshot because the snapshot command is generated according to the declarative model.

The applications may utilize compute resources (e.g., processor, memory, etc.) provided by the container orchestration platform 102 to the containers hosting the applications. However, an application may need persistent storage for storing data beyond what resources the container orchestration platform 102 offers. Accordingly, a distributed storage architecture 112 is deployed for providing storage for the applications hosted within the container orchestration platform 102. In some embodiments, the distributed storage architecture 112 is not hosted within the container orchestration platform 102 but may be hosted external to the container orchestration platform 102. The distributed storage architecture 112 includes a plurality of work nodes, such as a first worker node 114, a second worker node 116, a third worker node 118, and/or other worker nodes. In some embodiments, the worker nodes may be implemented as containers, virtual machines, serverless threads, or other hardware or software components. The worker nodes are configured to manage distributed storage 120 hosted by the distributed storage architecture 112. The distributed storage 120 is comprised of storage of storage devices managed by (e.g., attached to) the worker nodes, such as a first set of storage devices 122 of the first worker node 114, a second set of storage devices 124 of the second worker node 116, a third set of storage devices 126 of the third worker node 118, etc. The distributed storage 120 may be made accessible to the applications within the container orchestration platform 102. In some embodiments, a volume may be created within the distributed storage 120. The first application 106 may be provided with mountable access to the volume so that the first application 106 can store and retrieve data from the volume. The data of the volume may be slice/distributed across storage devices of one or more worker nodes. One of the worker nodes, such as the first worker node 114 may be designated as an owner of the volume even though the data could be stored across storage devices attached to other worker nodes.

The distributed storage architecture 112 may support an imperative model (an imperative programming model) of programming code. Thus, the worker nodes of the distributed storage architecture 112 may be capable of executing commands (formatted according to the imperative model, such as commands comprising programming instructions or executable steps. In some embodiments, a snapshot command formatted according to the imperative model may include programming instructions or executable steps that a worker node can execute in order to create a snapshot. Because the distributed storage architecture 112 may not support the declarative model used by the applications of the container orchestration platform 102, the worker nodes of the distributed storage architecture 112 may be unable to process commands defined by the applications. As illustrated in the embodiments shown in FIG. 1A, a distributed control plane 128 is provided for reformatting commands between the imperative model and the declarative model in order to facilitate communication and execution of commands between the applications and the worker nodes. The distributed control plane 128 may include a plurality of control plane controllers that are configured to reformat/convert commands formatted according to the declarative model supported by the container orchestration platform 102 into reformatted commands formatted according to the imperative model supported by the distributed storage architecture 112, and vice versa.

In some embodiments of a control plane controller of the distributed control plane 128 reformatting commands, the control plane controller may receive a command formatted according to the declarative model. The control plane controller interprets the command to determine an intent of the command (e.g., a specified outcome, an objective of the command, a result that the command is to achieve, a purpose of the command, etc.), such as where the command has the intent for a volume object to be provisioned. The intent may be identified based upon parameters, text, and/or other information within the command, such as where the command indicates that a volume object with a particular name and size is to be provisioned, but does not include instructions for how to provision the volume object (e.g., an algorithm or text parsing function may be used to parse the command to identify a specified outcome of the command). The control plane controller compares the intent against a current state of the volume object, and issues reformatted commands to change the current state of the volume object if necessary. For example, a reformatted command may change the current state to a provisioning state to indicate that the volume object is currently being provisioned. The reformatted commands may comprise instructions that can be executed by a worker node of the distributed storage architecture 112 to provision the volume object. The reformatted commands may be imperative commands supported by the distributed storage architecture 112. In this way, the control plane controller routes the imperative commands to the worker node of the distributed storage architecture 112 for execution. The imperative commands may be run as jobs by the worker node. The control plane controller may monitor the progress of the jobs, such as the progress of long running jobs. If the control plane controller detects that a job has failed, then the control plane controller may retry the job.

The distributed control plane 128 may be hosted within the container orchestration platform 102. In some embodiment, each control plane controller may be hosted within a pod of the container orchestration platform 102, such as where a first control plane controller 136 is hosted within a first pod 130, a second control plane controller 138 is hosted within a second pod 132, and a third control plane controller 140 is hosted within a third pod 134. In this way, the control plane controllers of the distributed control plane 128 are hosted within the container orchestration platform 102 and may leverage resources, services, communication APIs, and/or other functionality of the container orchestration platform 102. In some embodiments, each control plane controller may be paired with a worker node according to a one to one pairing/relationship, such as where the first control plane controller 136 is paired with the first worker node 114, the second control plane controller 138 is paired with the second worker node 116, and the third control plane controller 140 is paired with the third worker node 118. In some embodiments, there may be a one to many or many to one pairing/relationship between control plane controllers and worker nodes (e.g., a control plane controller paired with multiple worker nodes or a worker node paired with multiple control plane controllers). Each worker node may be designated by the distributed storage architecture 112 as a current owner of certain objects such as volumes stored within the distributed storage 120. Accordingly, the distributed control plane 128 is configured to route commands from applications within the container orchestration platform 102 to control plane controller paired with worker nodes that are current owners of objects targeted by the commands. In this way, a control plane controller paired with a worker node can reformat commands targeting objects owned by the worker node and route the reformatted commands to the worker node to execute.

Figure 1B:
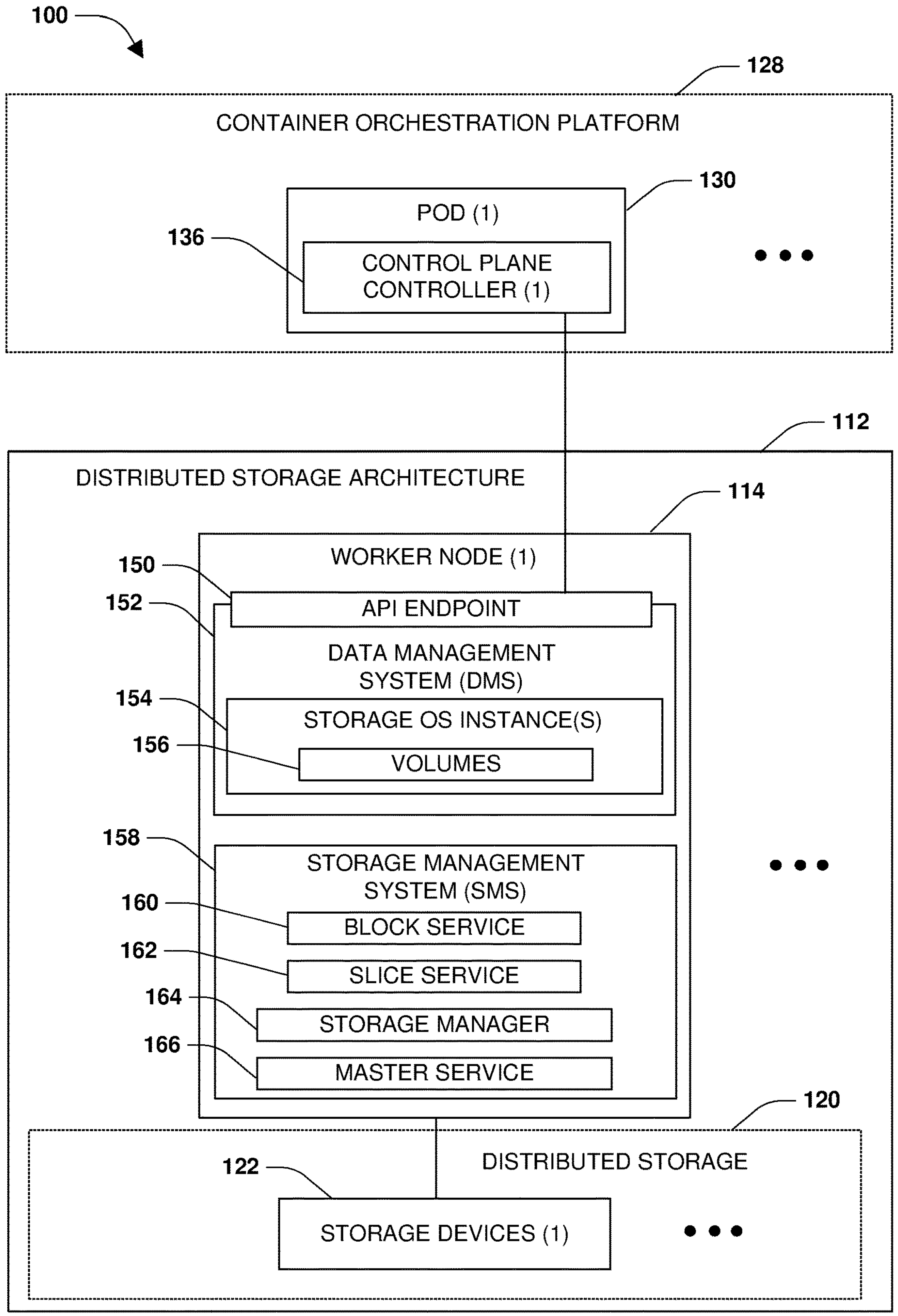
FIG. 1B is a block diagram illustrating an example of a control plane controller paired with a worker node in accordance with an embodiment of the present technology.

FIG. 1B is a block diagram illustrating an example of a control plane controller paired with worker node in accordance with an embodiment of the present technology. In some embodiments, the first control plane controller 136 is paired with the first worker node 114 so that the first control plane controller 136 can communicate with the first worker node 114 through an API endpoint 150 of the first worker node 114. In some embodiments, the API endpoint 150 may be a representational state transfer (REST) API endpoint, and the first control plane controller 136 transmits reformatted commands through REST API calls to the REST API endpoint in order to communicate with the first worker node 114.

The first worker node 114 may comprise a data management system (DMS) 152 and a storage management system (SMS) 158. The data management system 152 is a client facing frontend with which clients (e.g., applications within the container orchestration platform 102) interact through the distributed control plane 128, such as where reformatted commands from the first control plane controller 136 are received at the API endpoint 150. The storage management system 158 is a distributed backend (e.g., instances of the storage management system 158 may be distributed amongst multiple worker nodes of the distributed storage architecture 112) used to store data on storage devices of the distributed storage 120.

The data management system 152 may host one or more storage operating system instances 154, such as a storage operating system instance accessible to the first application 106 through the first control plane controller 136 for storing data. In some embodiments, the first storage operating system instance may run on an operating system (e.g., Linux) as a process and may support various protocols, such as NFS, CIFS, and/or other file protocols through which clients may access files through the storage operating system instance. The storage operating system instance may provide an API layer through which applications may set configurations (e.g., a snapshot policy, an export policy, etc.), settings (e.g., specifying a size or name for a volume), and transmit I/O operations directed to volumes 156 (e.g., FlexVols) exported to the applications by the storage operating system instance. In this way, the applications communicate through the control plane controller with the storage operating system instance through this API layer. The data management system 152 may be specific to the first worker node 114 (e.g., as opposed to the storage management system (SMS) 158 that may be a distributed component amongst worker nodes of the distributed storage architecture). The storage operating system instance may comprise an operating system stack that includes a protocol layer (e.g., a layer implementing NFS, CIFS, etc.), a file system layer, a storage layer (e.g., a RAID layer), etc. The storage operating system instance may provide various techniques for communicating with storage, such as through ZAPI commands, REST API operations, etc. The storage operating system instance may be configured to communicate with the storage management system 158 through iSCSI, remote procedure calls (RPCs), etc. For example, the storage operating system instance may communication with virtual disks provided by the storage management system 158 to the data management system 152, such as through iSCSI and/or RPC.

The storage management system 158 may be implemented by the first worker node 114 as a storage backend. The storage management system 158 may be implemented as a distributed component with instances that are hosted on each of the worker nodes of the distributed storage architecture 112. The storage management system 158 may host a control plane layer. The control plane layer may host a full operating system with a frontend and a backend storage system. The control plane layer may form a control plane that includes control plane services, such as a slice service 162 that manages slice files used as indirection layers for accessing data on storage devices of the distributed storage 120, a block service 160 that manages block storage of the data on the storage devices of the distributed storage 120, a transport service used to transport commands through a persistence abstraction layer to a storage manager 164, and/or other control plane services. The slice service 162 may be implemented as a metadata control plane and the block service 160 may be implemented as a data control plane. Because the storage management system 158 may be implemented as a distributed component, the slice service 162 and the block service 160 may communicate with one another on the first worker node 114 and/or may communicate (e.g., through remote procedure calls) with other instances of the slice service 162 and the block service 160 hosted at other worker nodes within the distributed storage architecture 112. Thus, the first worker node 114 may be a current owner of an object (a volume) whose data is sliced/distributed across storage device of multiple worker nodes, and the first worker node 114 can use the storage management system 158 to access the data stored within the storage devices of the other worker nodes by communicating with the other instances of the storage management system.

In some embodiments of the slice service 162, the slice service 162 may utilize slices, such as slice files, as indirection layers. The first worker node 114 may provide the applications, through the first control plane controller 136, with access to a LUN or volume using the data management system 152. The LUN may have N logical blocks that may be 1 kb each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the worker nodes of the distributed storage architecture 112. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

In some embodiments, the control plane layer may not directly communicate with the distributed storage 120, but may instead communicate through the persistence abstraction layer to a storage manager 164 that manages the distributed storage 120. In some embodiments, the storage manager 164 may comprise storage operating system functionality running on an operating system (e.g., Linux). The storage operating system functionality of the storage manager 164 may run directly from internal APIs (e.g., as opposed to protocol access) received through the persistence abstraction layer. In some embodiments, the control plane layer may transmit I/O operations through the persistence abstraction layer to the storage manager 164 using the internal APIs. For example, the slice service 162 may transmit I/O operations through the persistence abstraction layer to a slice volume hosted by the storage manager 164 for the slice service 162. In this way, slice files and/or metadata may be stored within the slice volume exposed to the slice service 162 by the storage manager 164. In some embodiments, the storage management system 158 implements a master service 166 that performs cluster services amongst the worker nodes.

Figure 1C:
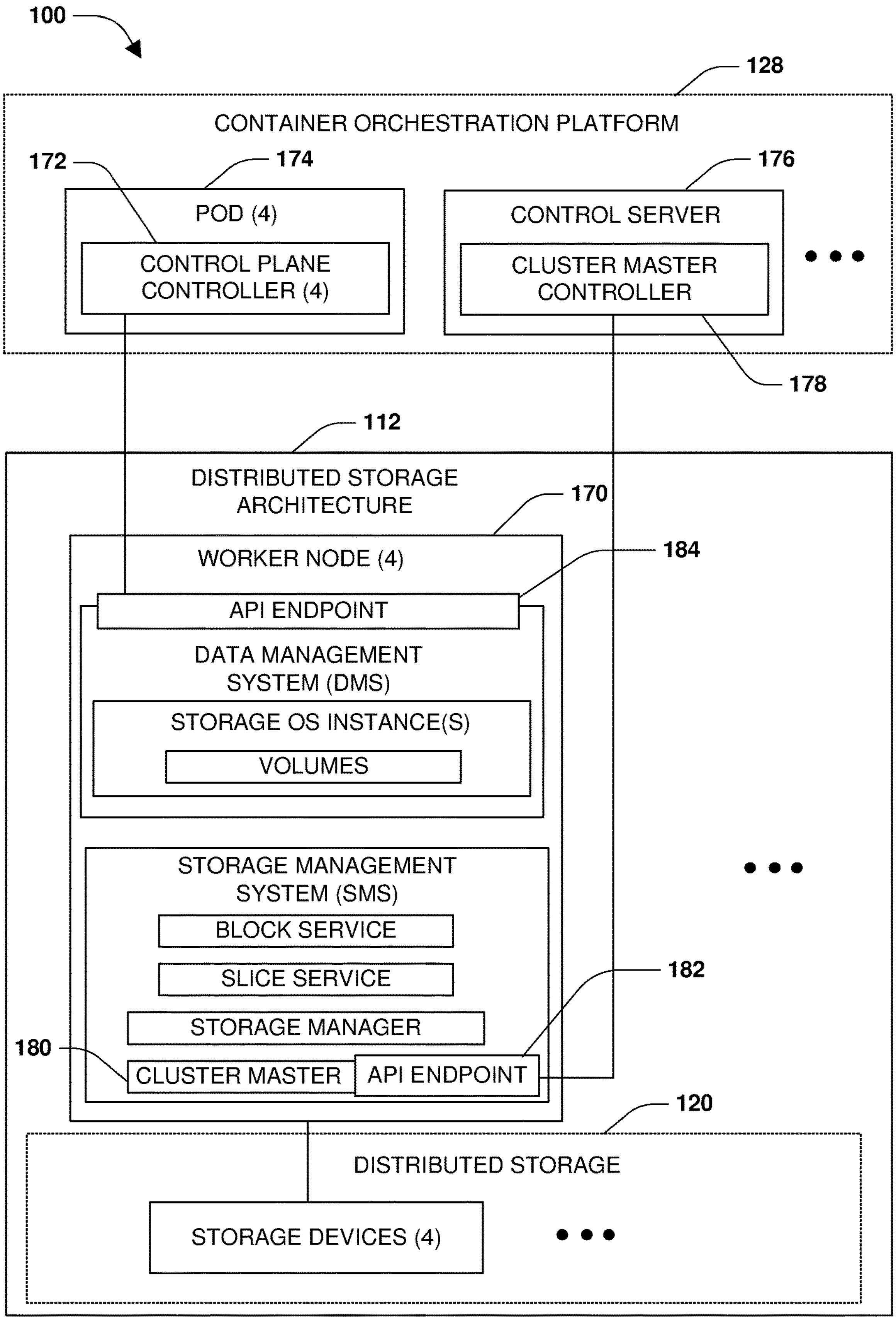
FIG. 1C is a block diagram illustrating an example of a control plane controller and a cluster controller paired with a worker node in accordance with an embodiment of the present technology.

FIG. 1C is a block diagram illustrating an example of a control plane controller and a cluster controller paired with worker node in accordance with an embodiment of the present technology. A fourth worker node 170 of the distributed storage architecture 112 may be paired with a fourth control plane controller 172 hosted within a fourth pod 174 of the container orchestration platform 102. The fourth control plane controller 172 may communicate with the fourth worker node 170 through an API endpoint 184 such as a REST API endpoint. The fourth worker node 170 may also be paired with a control server 176 hosting a cluster master controller 178 within the container orchestration platform 102. The cluster master controller 178 may communicate with a cluster master 180 of the fourth worker node 170 through an API endpoint 182 such as a REST API endpoint. The cluster master controller 178 may be configured to handle certain types of operations, such as cluster creation commands, add/remove worker node commands, add/remove storage commands, volume APIs for creating hierarchies of objects being created by the volume APIs, and/or cluster management commands. Thus, the fourth control plane controller 172 may handle certain types of operations, while the cluster master controller 178 may handle other types of operations In some embodiments, a worker node may be designated as a cluster master, such as the fourth worker node 170 hosting the cluster master 180. The cluster master controller 178 and the cluster master 180 may be configured to implement commands corresponding to infrastructure APIs, such as the cluster creation commands, the add/remove worker node commands, the add/remove storage commands, the volume APIs for creating hierarchies of objects being created by the volume APIs, and/or cluster the management commands. In some embodiments, the cluster master controller 178 and the cluster master 180 may perform certain operations associated with commands corresponding to volume APIs. The cluster master controller 178 and the cluster master 180 may create a hierarchy of objects for volumes created by the volume APIs and may preserve volume core identifiers of the volumes across the plurality of worker nodes and/or control plane controllers. In this way, the volume core identifiers can be used by any worker node to identify the volumes.

Figure 2:
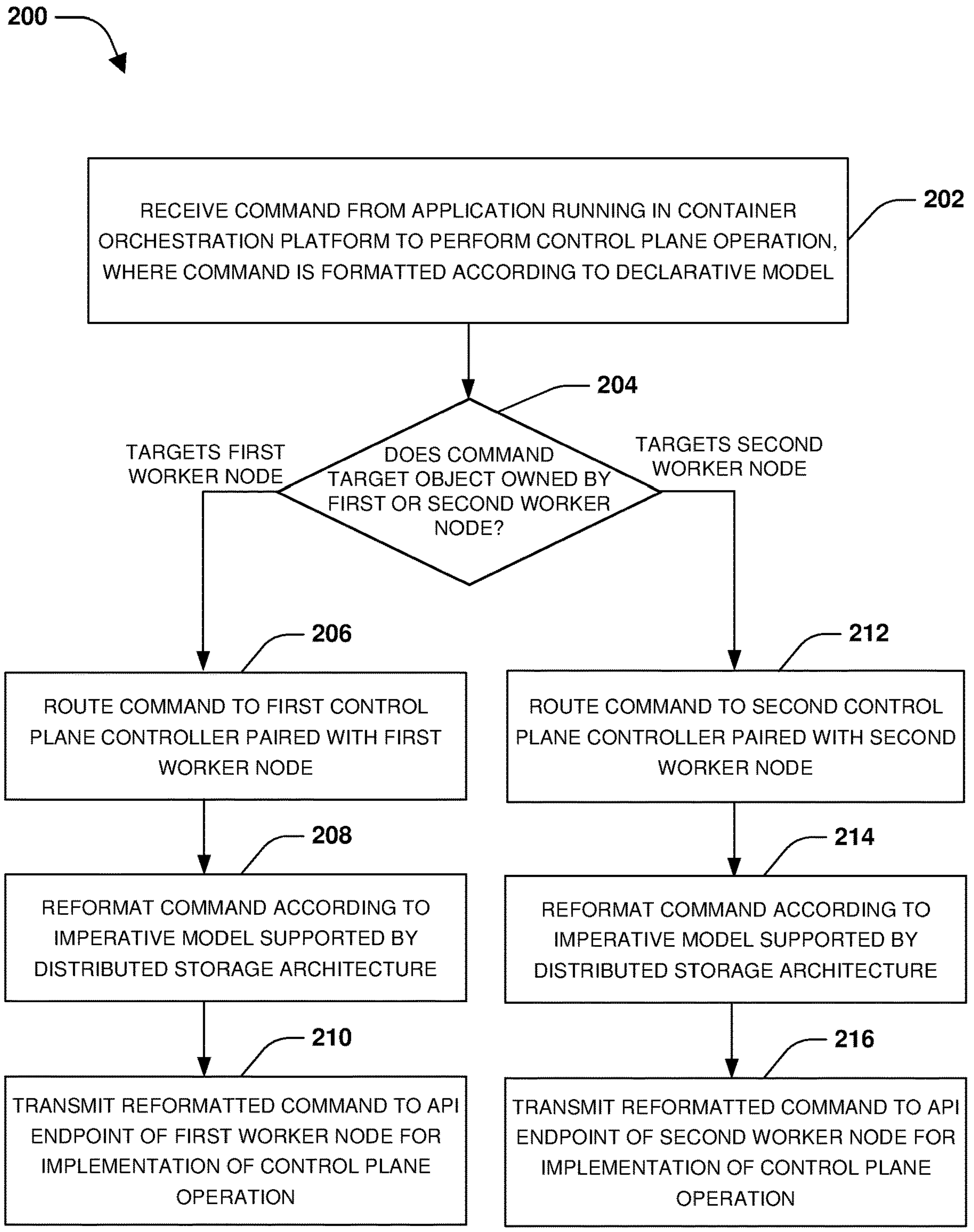
FIG. 2 is a flow chart illustrating an example of a set of operations that route commands to control plane controllers paired with worker nodes in accordance with various embodiments of the present technology.

FIG. 2 is a flow chart illustrating an example of a set of operations that route commands to control plane controllers paired with worker nodes in accordance with various embodiments of the present technology. The worker nodes of the distributed storage architecture 112 and the applications within the container orchestration platform 102 may utilize different programming models, and thus commands from the applications cannot natively be processed by the worker nodes. To solve this problem, the control plane controllers of the distributed control plane 128 are configured to reformat/translate the commands so that the commands can be interpreted and executed by the worker nodes. The distributed control plane 128 may be hosted within the container orchestration platform 102 that is also hosting the applications. In some embodiments, the control plane controllers of the distributed control plane 128 may be implemented as plug-ins to the container orchestration platform 102. A plug-in used to implement a control plane controller may be provided with access to a worker node through a REST API endpoint, such as the API endpoint 150 of FIG. 1B.

During operation 202 of method 200, the distributed control plane 128 may receive a command from an application hosted within a container of the container orchestration platform 102. In some embodiments, the command may correspond to a control plane operation, such as a command to provision a volume, a file command targeting a file, a snapshot create command to create a snapshot of a volume, a command to create or apply an export policy for a volume to control client access to the volume, a command to create a backup, a command to perform a restore operation, a cluster creation, deletion, or modification command, a command to add or remove storage, a command to add or remove a worker node, etc. The command may be formatted according to the declarative model supported by the container orchestration platform 102 and used by the applications to generate commands.

In some embodiments of receiving the command from the application, the application may generate the command, which is routed through the container orchestration platform 102 to the distributed control plane 128. In some embodiments of receiving the command from the application, a custom resource definition maintained within a distributed database hosted within the container orchestration platform 102 may be created or modified in order to define the command through the custom resource definition (as opposed to generating and transmitting the command). For example, the application may create a new custom resource definition for provisioning a volume within the distributed storage 120 of the distributed storage architecture 112 for use by the application. The new custom resource definition may be defined according to the declarative model such as through a custom resource specification listing attributes of the volume to create (e.g., volume name, volume size, etc.).

In some embodiments, custom resource definitions may correspond to a cluster custom resource definition, a volume custom resource definition, an export policy custom resource definition, a snapshot custom resource definition, a cloud backup custom resource definition, or other definitions of custom resources (e.g., a storage structure, data structure, functionality, or resource not natively supported by the storage orchestration platform). The distributed control plane 128 may monitor the distributed database for changes, such as the creation of the new custom resource definition or modifications to existing custom resource definitions. Upon detecting the new custom resource definition (or a modification to an existing custom resource definition), the distributed control plane 128 may extract information such as attributes from fields within a custom resource specification of the new custom resource definition as the control plane operation. The information may relate to volume information of the volume, cluster information for hosting the volume, volume name information, export policy information to manage access to the volume, permissions information for accessing the volume, quality of service policy information for hosting the volume, volume size information of the volume, or other information used to define a control plane operation. In this way, the control plane operation derived from the information extracted from the custom resource specification of the custom resource definition is received by the distributed control plane 128 as the command.

Once the distributed control plane 128 has received the command, the distributed control plane 128 may determine, during operation 204 of method 200, whether the command targets an object owned by the first worker node 114 or the second worker node 116 (or a different worker node). In some embodiments, the distributed control plane 128 evaluates object ownership information to identify which worker node is an owner of an object targeted by the command (e.g., an owner of a volume being modified, an owner of a file being operated upon, an owner of a volume being snapshotted, an owner of a backup being used to perform a restore, a worker node that is to host a volume being created, etc.). The object ownership information may be maintained by the distribute storage architecture 112, which may be evaluated for each command received in order to identify an owner of the object targeted by the command as ownership can change over time. In this way, the distributed control plane 128 can identify a control plane controller paired with the worker node currently owning the object targeted by the command.

If the first worker node 114 is the owner of the object targeted by the command, then the distributed control plane 128 may route the command to the first control plane controller 136, during operation 206 of method 200. During operation 208 of method 200, the first control plane controller 136 reformats the command from being formatted according to the declarative model to being formatted according to the imperative model as a reformatted command. In some embodiments, the information extracted from a custom resource definition as the control plane operation of the command may be used to construct executable operations, functions, and/or other imperative programming steps that can be executed by the first worker node 114 to perform/execute the reformatted command. During operation 210 of method 200, the first control plane controller 136 transmits the reformatted command, such as through a REST API call, to the API endpoint 150 of the first worker node 114 for the first worker node 114 to implement the control plane operation defined within the reformatted command according to the imperative model. In some embodiments, the REST API call includes a security certificate and/or credentials used to authenticate with the first worker node 114. In some embodiments, the first control plane controller 136 may create and monitor a job that the first worker node 114 performs in order to implement the control plane operation based upon the reformatted command. In this way, the first control plane controller 136 can track the status of performing the reformatted command by monitoring the job.

If the second worker node 116 is the owner of the object targeted by the command, then then the distributed control plane 128 may route the command to the second control plane controller 138 (or a control plane controller paired with the current owner worker node), during operation 212 of method 200. During operation 214 of method 200, the second control plane controller 138 reformats the command from being formatted according to the declarative model to being formatted according to the imperative model as a reformatted command. In some embodiments, the information extracted from a custom resource definition as the control plane operation of the command may be used to construct executable operations, functions, and/or other imperative programming steps that can be executed by the second worker node 116 to perform/execute the reformatted command. During operation 216 of method 200, the second control plane controller 138 transmits the reformatted command, such as through a REST API call, to an API endpoint of the second worker node 116 for the second worker node 116 to implement the control plane operation. In some embodiments, the REST API call includes a security certificate and/or credentials used to authenticate with the second worker node 116. In some embodiments, the second control plane controller 138 may create and monitor a job that the second worker node 116 performs in order to implement the control plane operation based upon the reformatted command. In this way, the second control plane controller 138 can track the status of performing the reformatted command by monitoring the job.

In some embodiments, a control plane controller that has transmitted a reformatted command to a worker node for implementation of a control plane operation may receive a response from the worker node. The response may comprise information relating to a current status (progress completion) of implementing the control plane operation, a result of completing the implementation of the control plane operation, warning information relating to implementing the control plane operation (e.g., a volume that is to be provisioned consumes more space than allowed, the volume has the same name as an existing volume, a snapshot targets a volume that does not exist, an export policy is being applied to a volume that does not exist, etc.), state information of the object (e.g., attributes of a volume that has been provisioned or a snapshot that has been created), etc. The control plane controller may convey this information back to the application requesting performance of the command by populating the information into a custom resource definition for the object (e.g., the volume, the snapshot, the export policy, etc.) targeted by the command. In some embodiments, the warning information or state information of the object may be populated within an event field of the custom resource definition. In some embodiments, other information may be populated within a status field of the custom resource definition, such as a create time, a name, an export policy, an export address, permission information, a quality-of-service policy, a size, a state of a volume, a path of a volume, etc. In this way, the control plane controller is used as an intermediary device for reformatting communicate between the application and the worker node, such as for facilitating the performance of commands to create new objects (create a volume), modify existing volumes, creating snapshots, creating clones, creating or applying export polices, etc. As will be described in further detail, FIG. 4 illustrates an example of a custom resource definition.

Figure 3:
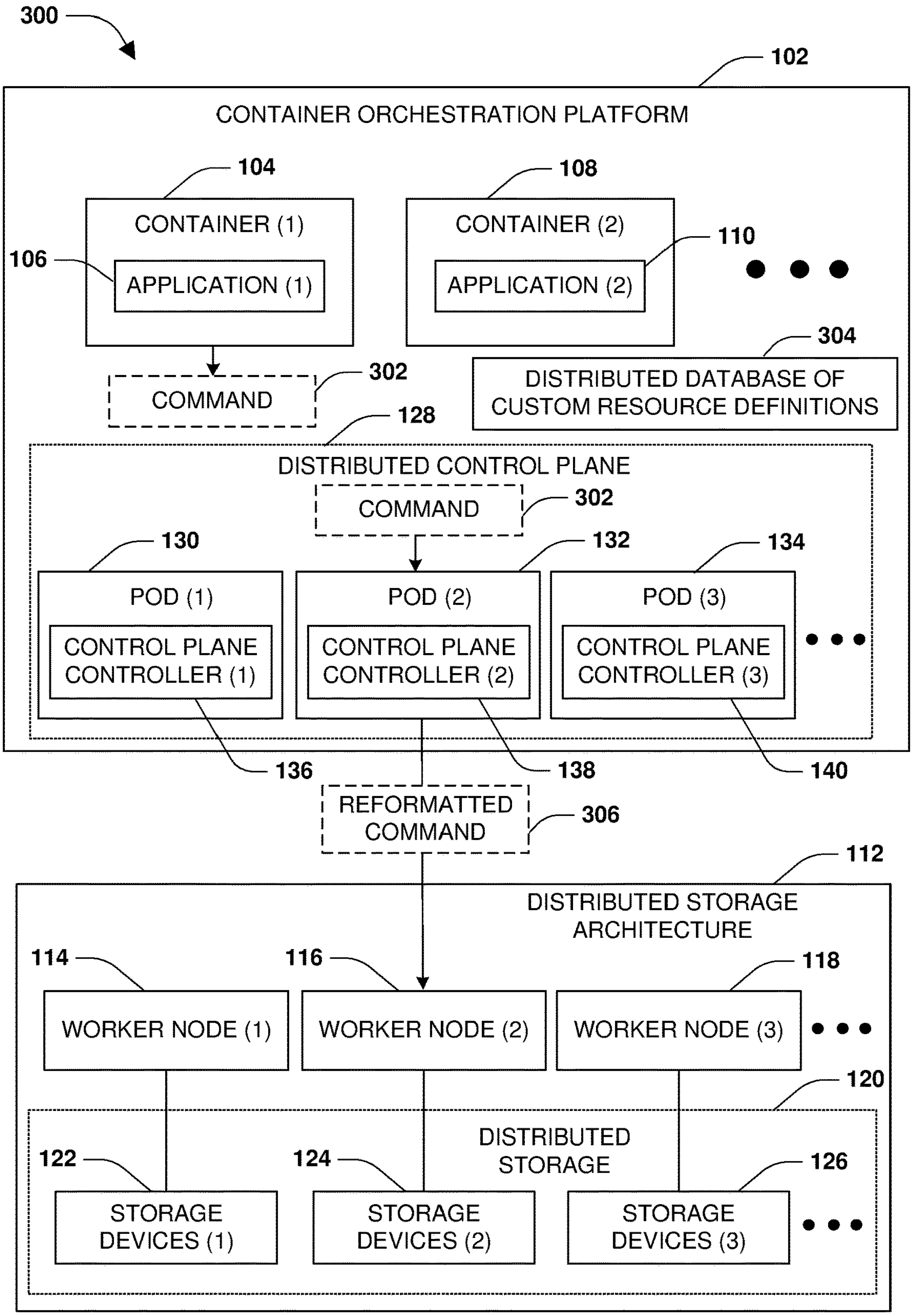
FIG. 3 is a block diagram illustrating an example of a control plane controller reformatting a command into a reformatted command that is then routed to a worker node in accordance with an embodiment of the present technology.

FIG. 3 is a block diagram illustrating an example of a control plane controller reformatting a command into a reformatted command routed to a worker node in accordance with an embodiment of the present technology. The first application 106 may generate a command 302 to create or modify an object. In some embodiments, the first application 106 may define the command 302 by creating a new custom resource definition or modifying an existing custom resource definition for the object. The custom resource definition may be stored within a distributed database 304 within the container orchestration platform 102. The distributed control plane 128 may receive the command 302, such as by extracting information from the custom resource definition to derive a control plane operation of the command 302. The distributed control plane 128 may evaluate ownership information of objects to identify the second worker node 116 as a current owner of the object targeted by the command. Accordingly, the distributed control plane 128 may route the command 302 to the second control plane controller 138 paired with the second worker node 116. The second control plane controller 138 may reformat the command 302 as a reformatted command 306 that is transmitted to the second worker node 116 to implement the control plane operation.

FIG. 4 is an example of a custom resource definition in accordance with an embodiment of the present technology. A custom resource definition 402 may be used to define custom objects (custom resources) within the container orchestration platform 102 (Kubernetes), such as to define a volume custom object. The custom object provides the ability to extend native capabilities (beyond standard objects natively supported by Kubernetes) of the container orchestration platform 102 (Kubernetes) by creating and adding any type of API object as a custom object. For example, Kubernetes may natively provide a Kubernetes volume as a directory or block device mounted inside a container running in a pod. This Kubernetes volume is a native Kubernetes object and is not a custom object defined through a custom resource definition. Kubernetes volumes represent physical devices managed by Kubernetes.

Various embodiments can use a custom resource definition to extend native Kubernetes capabilities in order to define and create a volume as a custom object that can be used by an application. This volume may be referred to as a volume custom object that is not a native Kubernetes object. This provides the ability to extend Kubernetes capabilities beyond the default native Kubernetes capabilities and standard objects natively supported by Kubernetes. In some embodiments, the custom resource definition may be created through a .yaml file, and comprises various fields used to define the volume custom object. Various types of custom objects may be defined through custom resource definitions, such as volumes, snapshots, nodes, clusters, backup functionality, restore functionality, etc. These custom objects (custom resources) defined by the custom resource definitions may be stored within the distributed storage 120 of the distributed storage architecture 112.

The custom resource definition 402 may comprise a custom resource specification 404 for a volume (e.g., a volume clone), which may be populated with information such as a volume clone identifier, a cluster name, a display name, an export policy, permissions information, a quality of service policy, a size of the volume, a snapshot reserve percentage (e.g., an amount of storage reserved for snapshots of the volume), access types allowed for the volume, a volume path of the volume, etc. In some embodiments, the custom resource specification 404 may be populated by an application to define a command (a control plane operation) targeting the volume or to define/provision the volume. The custom resource definition 402 may comprise a status field 406 for the volume (e.g., the volume clone), which may be populated with information such as the volume clone identifier, the cluster name, conditions (e.g., a last transition time, a message of whether the volume is online, a reason for the message such as because the volume is online, a status of the message such as the message being true, a type of the message such as a volume_online_type, etc.), whether the volume was successfully created, a display name, an export address, an export policy, an internal name, permissions information, a quality of service policy, a requested volume size, a restore cache size, a size of the volume, a snapshot reserve percentage, a state of the volume, a volume path, a volume UUID, etc. The status field 406 may be populated by a control plane controller with information from a response received by a worker node that implemented a control plane operation to provision the volume. In this way, the status field 406 may be used by the control plane controller to communicate information to the application regarding execution of the control plane operation. Similarly, the control plane controller can populate an events field 408 with state information of the volume and/or warning information relating the execution of the control plane operation (e.g., a size of the volume being provisioned is too large, a name for the volume is already assigned to an existing volume, etc.).

Figure 5:
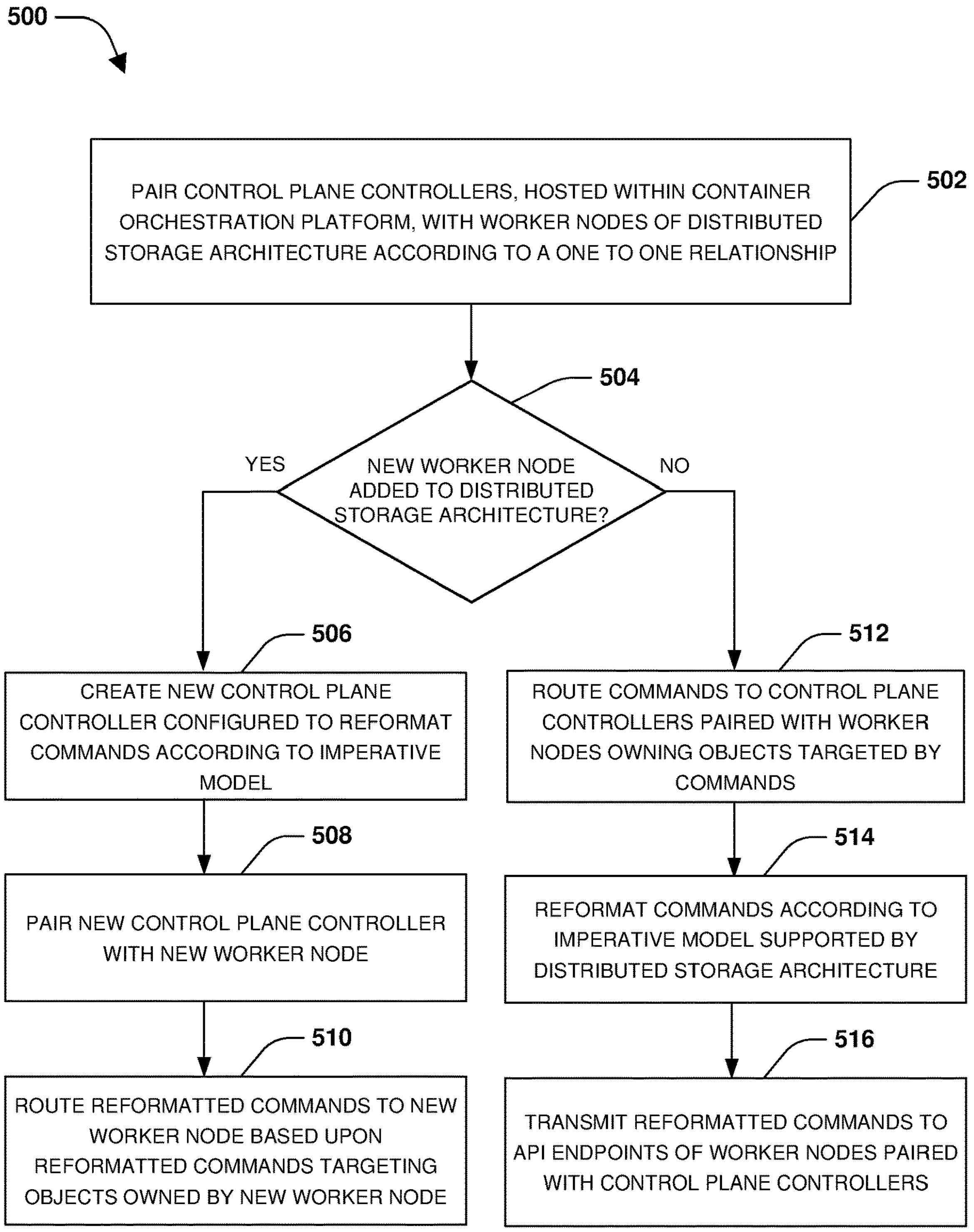
FIG. 5 is a flow chart illustrating an example of a set of operations that pair a new control plane controller with a new worker node in accordance with various embodiments of the present technology.

FIG. 5 is a flow chart illustrating an example of a set of operations that pair a new control plane controller with a new worker node in accordance with various embodiments of the present technology. During operation 502 of method 500, control plane controllers, hosted within the container orchestration platform 102, may be paired with worker nodes of the distributed storage architecture 112 according to a one or one relationship where a single control plane controller is paired with a single worker node. It may be appreciated that other pairing relationships are contemplated, such as where multiple control plane controllers are paired with a single worker node, or a control plane controller is paired with multiple worker nodes. In some embodiments of initially constructing the distributed control plane 128 with control plane controllers and/or subsequently modifying the distributed control plane 128, the distributed storage architecture 112 may be evaluated to identify a number of worker nodes hosted by the distributed storage architecture 112. For each worker node not already paired with a control plane controller, a pod (a container managed by a pod) may be created within the container orchestration platform 102. A control plane controller may be hosted within the pod (a newly created pod or an existing pod with additional resources to host the control plane controller). The control plane controller may be paired with a worker node not already paired with a control plane controller. In this way, the control plane controller is configured to communicate and format commands between the worker node and applications within the container orchestration platform 102 based upon the commands targeting objects currently owned by the worker node. Because worker nodes can be dynamically added and removed from the distributed storage architecture 112, the distributed control plane 128 may be configured to create or remove control plane controllers in order to scale up or down based upon a current number of worker nodes of the distributed storage architecture 112.

The distributed control plane 128 is configured to selectively route commands to control plane controllers that are paired with worker nodes that are current owners of object targeted by the commands. In some embodiments, if a command relates to a volume provisioning task to create a volume, then the distributed control plane 128 routes the command to a worker node designated to be an owner of the volume. In some embodiments, the distributed control plane 128 may track ownership of objects that are owned by particular worker nodes. This ownership information can be used to identify which worker node owns an object (e.g., owner of a volume, a file, a snapshot or backup that can be used to perform a restore operation, a worker node to host a new volume, a worker node to create and manage a snapshot, etc.) so that a command targeting the object can be routed to a control plane controller paired with that worker node. Ownership of objects can dynamically change amongst worker nodes, and thus the distributed control plane 128 may update the ownership information over time to reflect such ownership changes.

During operation 504 of method 500, the distributed control plane 128 may determine whether a new worker node has been added to the distributed storage architecture 112. If the new worker node has been added to the distributed storage architecture 112, then the distributed control plane 128 may create a new control plane controller configured to reformat commands to create reformatted commands formatted according to the imperative model of programming, during operation 506 of method 500. In some embodiments, a new pod may be created to host the new control plane controller within the container orchestration platform 102 or the new control plane controller may be hosted within an existing pod or container with resources available for hosting the new control plane controller. Compute and/or other resources of the container orchestration platform 102 may be assigned to the pod for use by the new control plane controller. During operation 508 of method 500, the new control plane controller may be paired with the new worker node so that the new control plane controller can communicate with the new worker node through an API endpoint (a REST API endpoint) of the new worker node.

During operation 510 of method 500, the new control plane controller may be configured to create and route reformatted commands to the new worker node based upon the new worker node owning objects targeted by the reformatted commands. In some embodiments, the new control plane controller may generate a reformatted command from a command to perform a control plane operation. The control plane operation may target a volume owned by the new worker node. Data of the volume may be sliced/distributed across storage of multiple worker nodes of the distributed storage architecture 112. In some embodiments, the control plane operation may be executed by the new worker node to create a snapshot of the volume whose data is sliced across the storage devices of the multiple worker nodes. The new control plane controller may be configured to populate a custom resource definition maintained within the container orchestration platform 102 for the object targeted by the control plane operation. The custom resource definition may be populated with information received within a response from the new worker node executing the control plane operation, such as status information, event information such as warning or state information, etc.

If the distributed control plane 128 determines that no new worker nodes have been added to the distributed storage architecture 112, then commands may be routed to control plane controllers paired with existing worker nodes owning objects targeted by the commands, during operation 512 of method 500. During operation 514 of method 500, the control plane controllers reformat commands into reformatted commands according to the imperative model supported by the distributed storage architecture 112. In some embodiments, the control plane controllers may reformat commands corresponding to setting polices for objects, such as a security policy, an export policy, or access control list used to determine what applications are allowed to access certain objects. During operation 516 of method 500, the control plane controllers route the reformatted commands to the worker nodes paired with the control plane controllers. In some embodiments, commands may be processed by control plane controllers in parallel based upon the commands targeting objects owned by different worker nodes to which the control plane controllers are paired, which improves throughput and processing of commands due to parallel processing of the commands.

Figure 6:
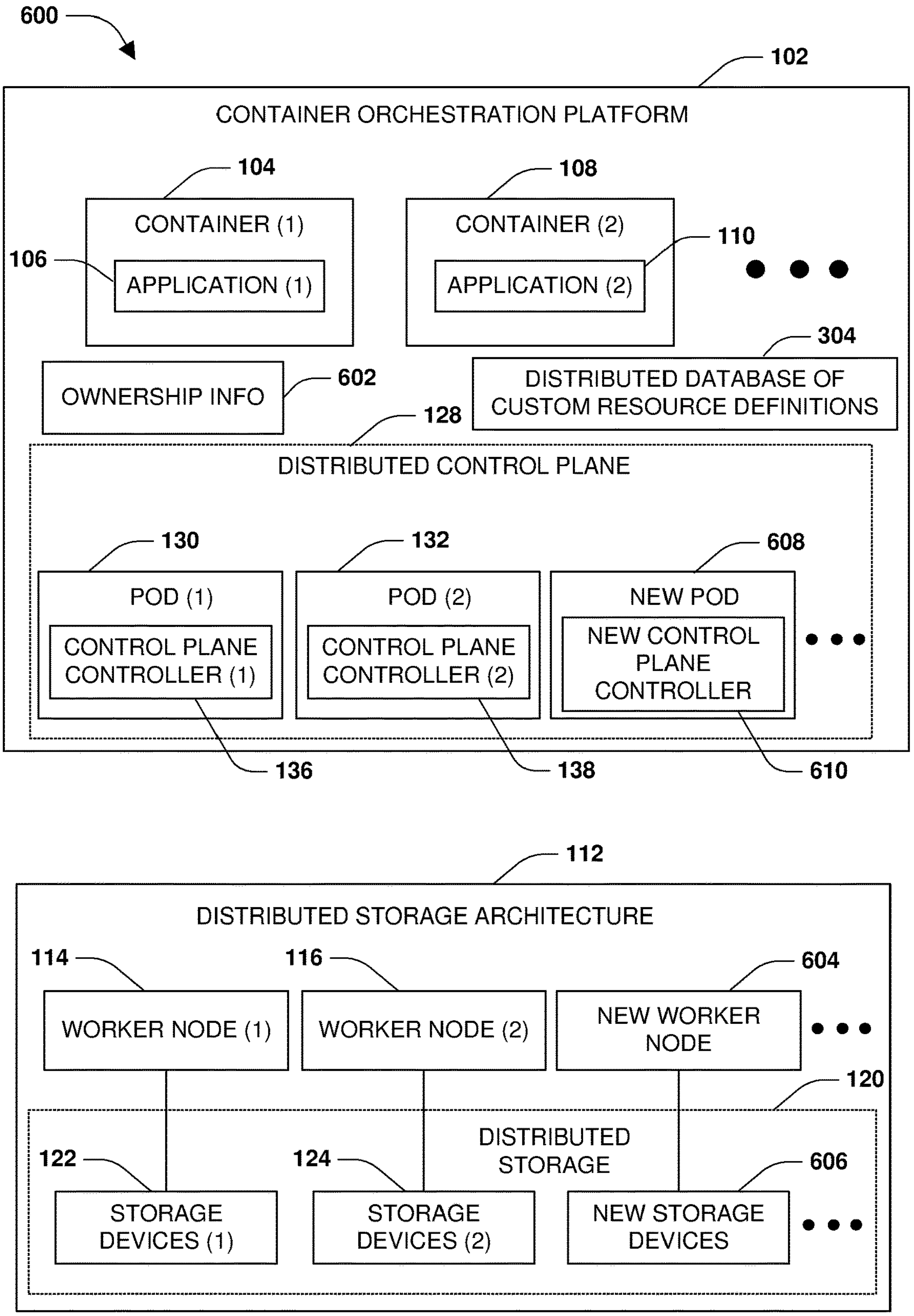
FIG. 6 is a block diagram illustrating an example of pairing a new control plane controller with a new worker node in accordance with an embodiment of the present technology.

FIG. 6 is a block diagram illustrating an example of pairing a new control plane controller with a new worker node in accordance with an embodiment of the present technology. The distributed control plane 128 may be configured to monitor the distributed storage architecture 112 to determine whether the distributed storage architecture 112 has added or removed worker nodes. In some embodiments, the distributed control plane 128 may determine that the distributed storage architecture 112 added a new worker node 604 and new storage devices 606 for the new worker node 604. Accordingly, the distributed control plane 128 may create a new pod 608 (or new container) and may host a new control plane controller 610 within the new pod 608. The new control plane controller 610 may be configured to facilitate communication of commands between the applications within the container orchestration platform 102 and the new worker node 604 based upon the commands targeting objects owned or to be owned by the new worker node 604. Such object ownership information 602 may be tracked by the distributed control plane 128.

Figure 7:
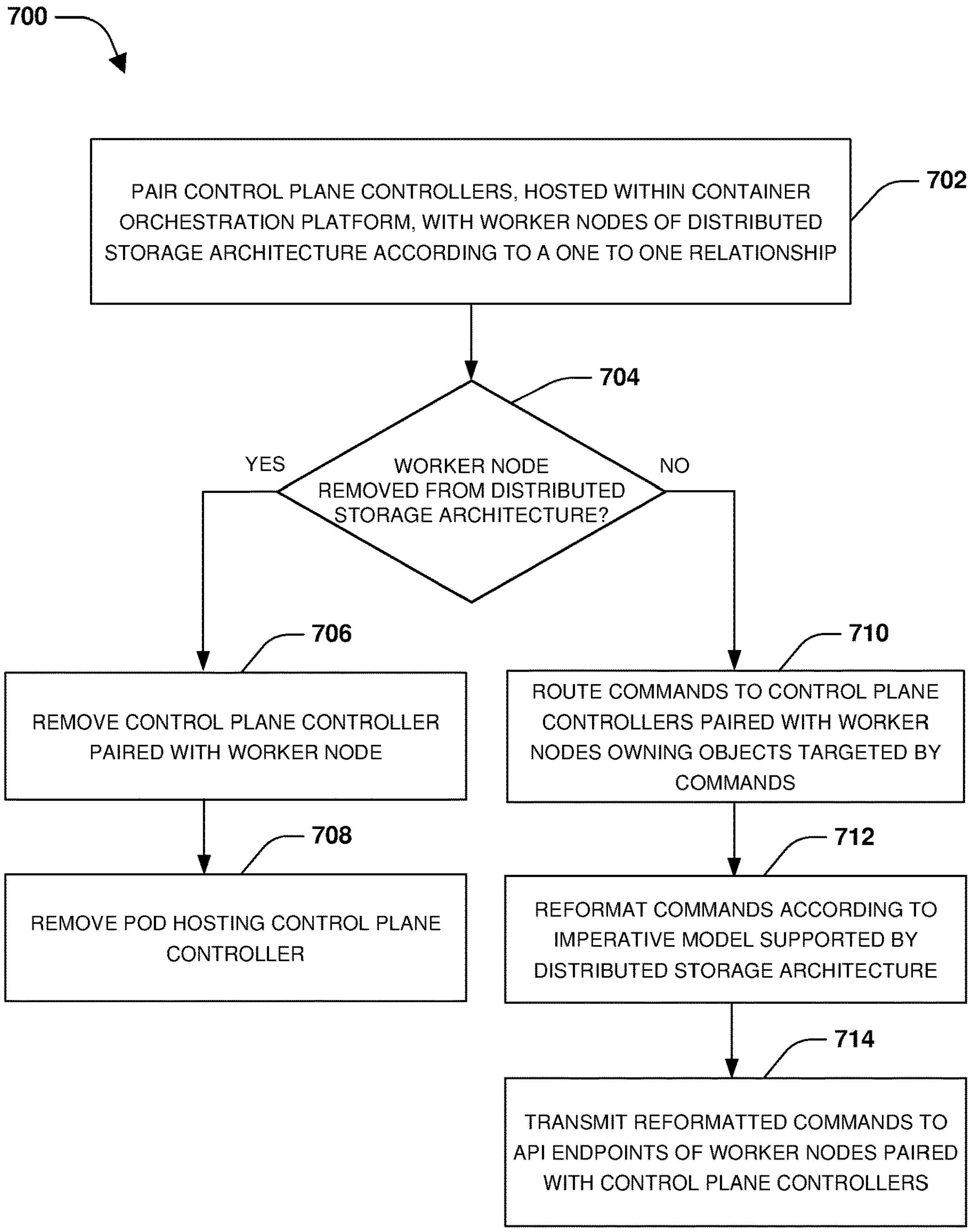
FIG. 7 is a flow chart illustrating an example of a set of operations that remove a control plane controller and pod based upon a worker node being removed from a distributed storage architecture in accordance with various embodiments of the present technology.

FIG. 7 is a flow chart illustrating an example of a set of operations that remove a control plane controller and pod based upon a worker node being removed from a distributed storage architecture in accordance with various embodiments of the present technology. During operation 702 of method 700, control plane controllers, hosted within the container orchestration platform 102, may be paired with worker nodes of the distributed storage architecture 112 according to a one or one relationship where a single control plane controller is paired with a single worker node. During operation 704 of method 700, the distributed control plane 128 may determine whether a worker node has been removed from the distributed storage architecture 112. If the worker node has been removed from the distributed storage architecture 112, then a control plane controller paired with the worker node may be removed from the container orchestration platform 102, during operation 706 of method 700. If a pod hosting the control plane controller is not hosting other control plane controllers, then the pod may be removed from the container orchestration platform 102, during operation 708 of method 700.

If the distributed control plane 128 determines that no worker nodes have been removed from the distributed storage architecture 112, then the control plane controller may route commands to control plane controllers paired with worker nodes owning objects targeted by the commands, during operation 710 of method 700. The control plane controllers may reformat the commands according to an imperative model supported by the distributed control plane 128, during operation 712 of method 700. The control plane controllers may transmit the reformatted commands to API endpoints of the worker nodes paired with the control plane controllers, during operation 714 of method 700.

Figure 8:
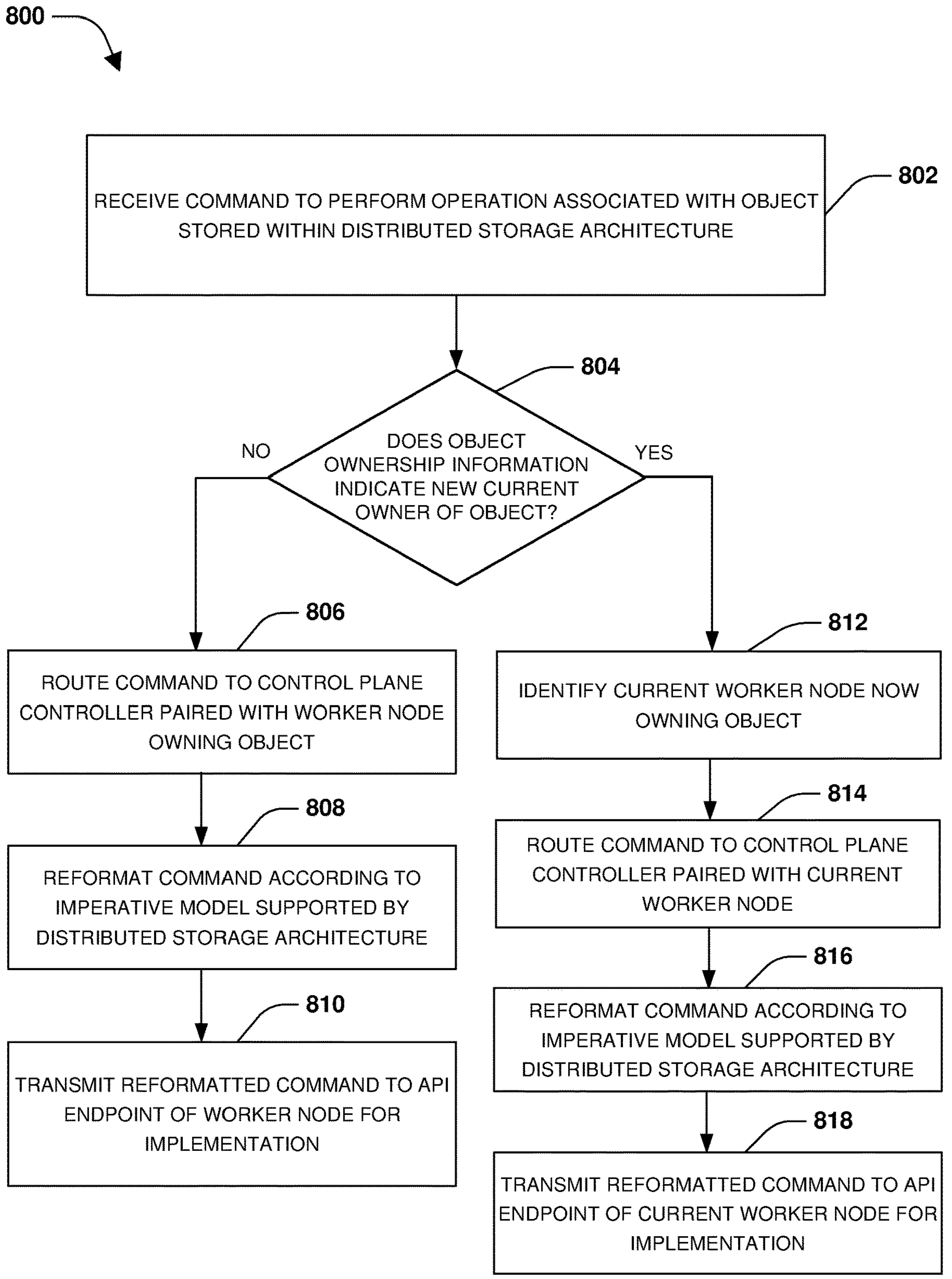
FIG. 8 is a flow chart illustrating an example of a set of operations that track ownership information of objects so that commands are routed to control plane controllers paired with worker nodes that are owners of objects targeted by the commands in accordance with various embodiments of the present technology.

FIG. 8 is a flow chart illustrating an example of a set of operations that track ownership information of objects so that commands are routed to control plane controllers paired with worker nodes that are owners of objects targeted by the commands in accordance with various embodiments of the present technology. The distributed control plane 128 may identify and/or track ownership information of objects stored within the distributed storage 120. The ownership information may indicate which worker nodes within the distributed storage architecture 112 are current owners of objects, such as volumes, snapshots, export policies, and/or other types of objects maintained on behalf of the applications hosted within the container orchestration platform 102. Data of an object may be stored within storage devices of one or more worker nodes, but a single worker node may be designated as an owner of the object at any given point in time. Ownership of the object may change for various reason, such as due to load balancing by the distributed storage architecture 112 or due the distributed storage architecture 112 failing over ownership of objects from a failed worker node to a different worker node. In some embodiments, ownership of an object may change from one worker node to another worker node while retaining data of the object within current storage locations within the distributed storage 120. Thus, object ownership may change without having to migrate data of the object.

In some embodiments, the distributed control plane 128 may identify and track the ownership information by requesting object owner information from the distributed storage architecture 112 or the container orchestration platform 102. In some embodiments, the distributed control plane 128 may periodically poll the distributed storage architecture 112 or the container orchestration platform 102 to obtain updated object ownership information. In some embodiments, the distributed control plane 128 may execute a polling thread at a cluster level to detect object ownership changes of objects amongst worker nodes that form a cluster within the distributed storage architecture 112. In some embodiments, if the distributed control plane 128 determines that ownership of an object has changed from the first worker node 114 to the third worker node 118, then the distributed control plane 128 may update the ownership information such as by modifying an entry within the ownership information for the object to now map to an identifier or name of the third worker node 118. Each object within the ownership information may have an entry mapping an identifier or name of an object to an identifier or name of a worker node currently owning the object. In some embodiments, the distributed control plane 128 may detect a failure of the second worker node 116 (e.g., a loss of a heartbeat, receiving a failure notification from the distributed storage architecture 112, a certain amount of time lapsing without receiving a response from the second worker node 116, etc.). Accordingly, the distributed control plane 128 may identify one or more worker nodes that are now the new owners of objects that were owned by the second worker node 116 and may update the ownership information accordingly.

Ownership of objects may be identified and/or determined periodically and/or dynamically when a command has been received from an application by the distributed control plane 128. During operation 802 of method 800, the distributed control plane 128 may receive a command from an application. The distributed control plane 128 may evaluate the command to identify an object as a target of the command. In some embodiments, the command may comprise a volume identifier or name of a volume targeted by the command. In some embodiments, the command may be a snapshot create command to create a snapshot of the volume. In some embodiments, the command may be a file operation command targeting a file stored within the distributed storage 120. In some embodiments, the command is a provision command to create a volume that is exposed to the application for mountable access as a network file system (NFS) volume. In some embodiments, the command may target a volume whose data is sliced/distributed across storage devices of multiple worker nodes, and a worker node that is designated as an owner of the volume may be one of the worker nodes or a different worker node whose storage devices do not store data of the volume.

During operation 804 of method 800, the distributed control plane 128 may determine whether the ownership information indicates that ownership of the object targeted by the command has changed. If ownership of the object has not changed, then the command is routed to a control plane controller paired with the worker node owning the object, during operation 806 of method 800. During operation 808 of method 800, the control plane controller may reformat the command according to the imperative model supported by the distributed storage architecture 112 to create a reformatted command. During operation 810 of method 800, the control plane controller may transmit the reformatted command to an API endpoint of the worker node for implementation. In some embodiments, the worker node may execute a control plane operation defined by the reformatted command as executable instructions or programming steps that the worker node can execute according to the imperative model upon the object, such as to create a snapshot of a volume whose data is sliced/distributed across storage devices of multiple worker nodes.

If ownership of the object has changed, then the distributed control plane 128 identifies the current worker node now owning the object, during operation 812 of method 800. During operation 814 of method 800, the distributed control plane 128 routes the command to a control plane controller paired with the current worker node now owning the object. During operation 816 of method 800, the control plane controller may reformat the command according to the imperative model supported by the distributed storage architecture 112 to create a reformatted command. During operation 818 of method 800, the control plane controller may transmit the reformatted command to an API endpoint of the current worker node for implementation.

Figure 9A:
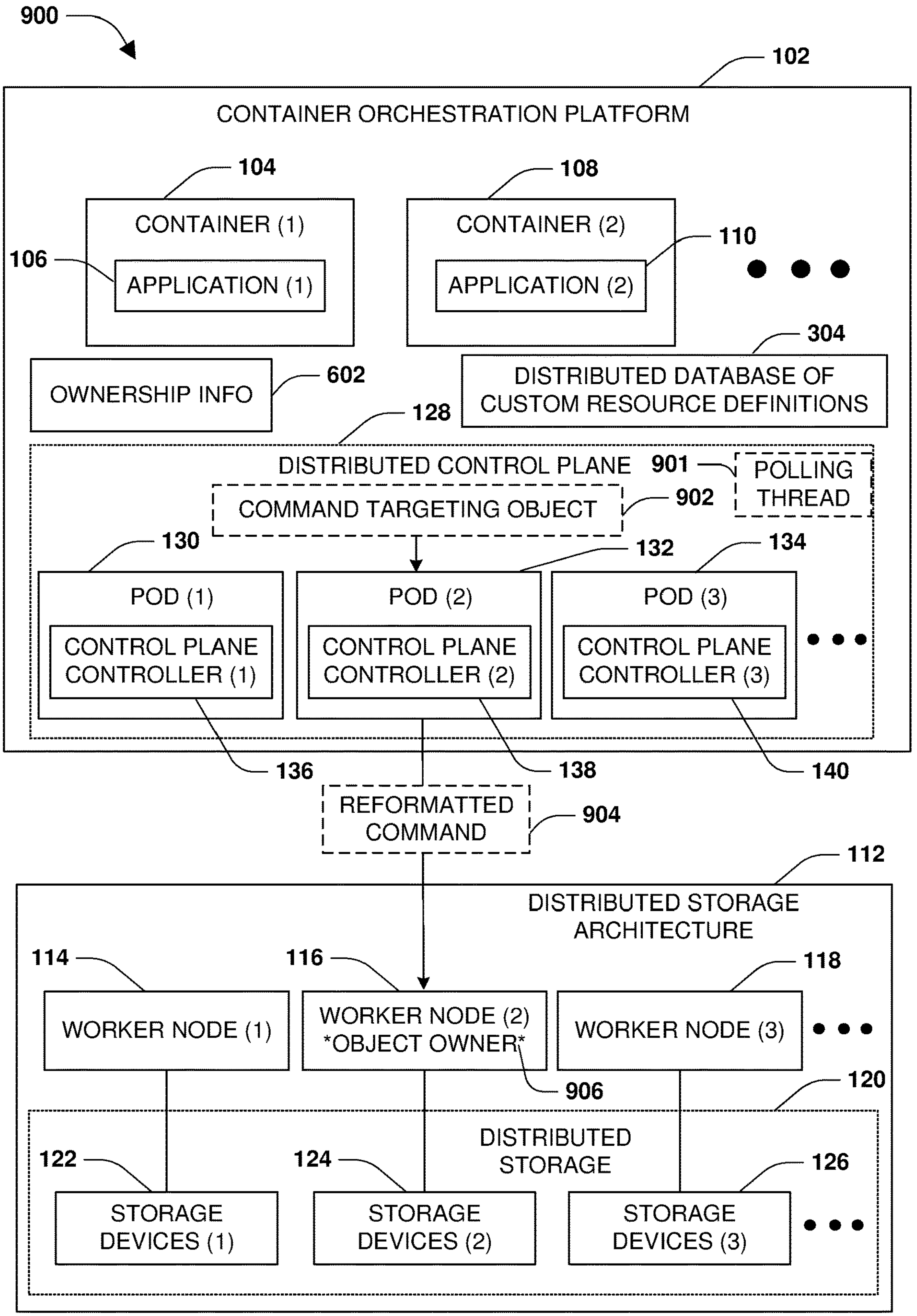
FIG. 9A is a block diagram illustrating an example of tracking ownership information of objects so that commands are routed to control plane controllers paired with worker nodes that are owners of objects targeted by the commands in accordance with an embodiment of the present technology.

FIG. 9A is a block diagram illustrating an example of tracking ownership information of objects so that commands are routed to control plane controllers paired with worker nodes that are owners of objects targeted by the commands in accordance with an embodiment of the present technology. The distributed control plane 128 may be provided with access to ownership information 602 of objects stored within the distributed storage 120 of the distributed storage architecture 112. When the distributed control plane 128 receives a command 902 from an application hosted within the container orchestration platform 102, the distributed control plane 128 may evaluate the ownership information 602 to identify a worker node that is a current owner of an object targeted by the command 902. In some embodiments, the distributed control plane 128 may executed a polling thread 901 to identify the ownership information 602 for identifying the worker node that is the current owner of the object targeted by the command 902. In some embodiments, the ownership information 602 may indicate that the second worker node 116 is the current owner 906 of the object. Accordingly, the distributed control plane 128 may route the command 902 to the second control plane controller 138 paired with the second worker node 116. The second control plane controller 138 may reformat the command 902 to create a reformatted command 904 that is transmitted to the second worker node 116 for execution.

Figure 9B:
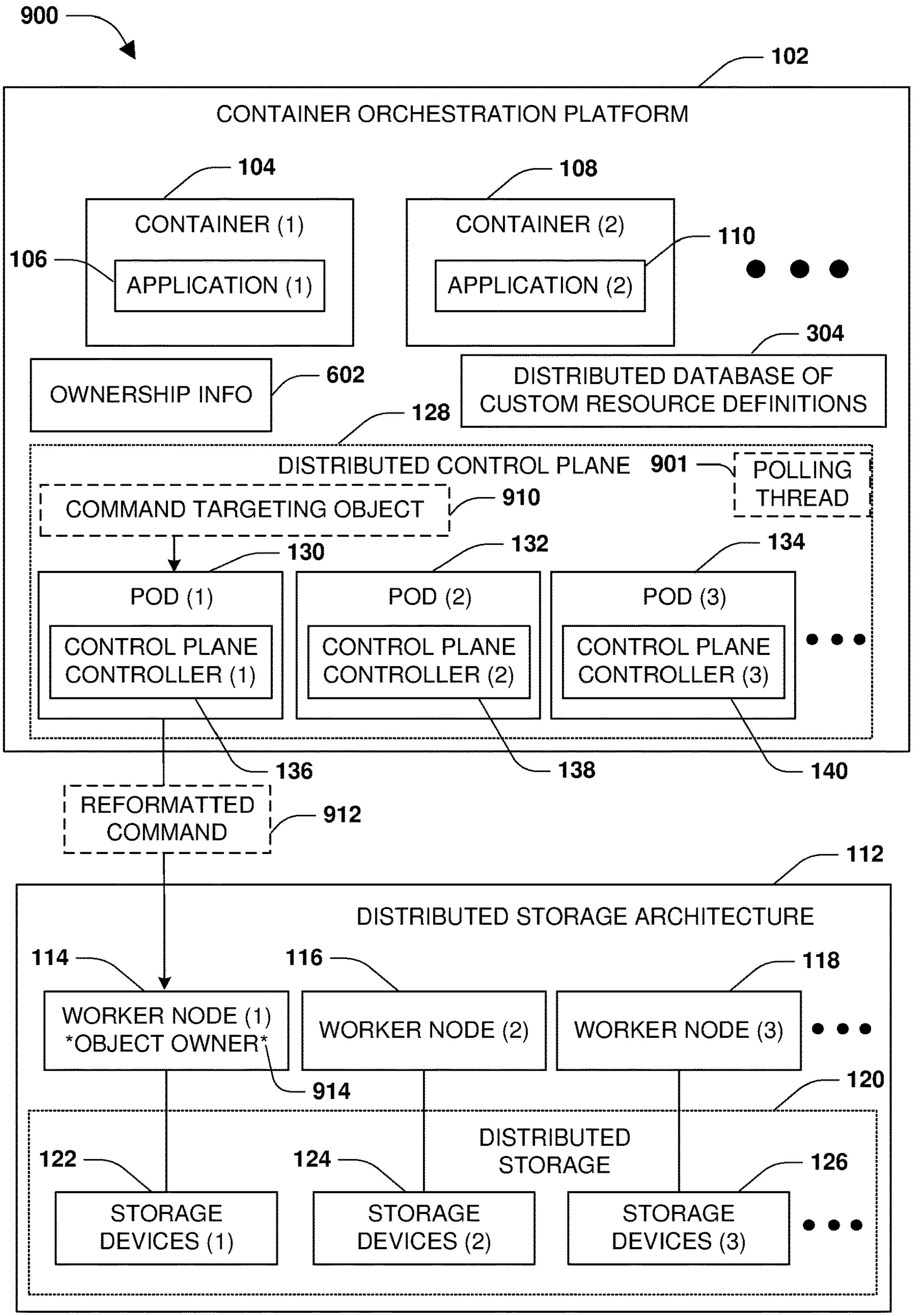
FIG. 9B is a block diagram illustrating an example of tracking ownership information of objects so that commands are routed to control plane controllers paired with worker nodes that are owners of objects targeted by the commands in accordance with an embodiment of the present technology.

FIG. 9B is a block diagram illustrating an example of tracking ownership information of objects so that commands are routed to control plane controllers paired with worker nodes that are owners of objects targeted by the commands in accordance with an embodiment of the present technology. The distributed control plane 128 may receive a subsequent command 910 that is received after the command 902. The distributed control plane 128 may determine that the subsequent command 910 targets the same object that the command 902 targeted. The distributed control plane 128 may evaluate the ownership information 602 to identify a current owner of the object. The ownership information 602 may indicate that ownership of the object changed from the second worker node 116 to the first worker node 114. Accordingly, the distributed control plane 128 may route the subsequent command 910 to the first control plane controller 136 paired with the first worker node 114 that is the current owner 914 of the object. The first control plane controller 136 may reformat the subsequent command 910 to create a reformatted subsequent command 912 that is transmitted to the first worker node 114 for execution.

FIG. 10 is a flow chart illustrating an example of a set of operations that route commands to control plane controllers paired with worker nodes based upon whether the worker nodes are operational or have failed in accordance with various embodiments of the present technology. The distributed control plane 128 may be configured to identify and/or track the status of worker nodes of the distributed storage architecture 112, such as health status information of the worker nodes. The health status information may indicate whether a worker node is operational, failed, overloaded and operating with degraded performance, etc. In some embodiments, the distributed control plane 128 tracks the health status information by polling the distributed storage architecture 112 for status information of the worker nodes. In some embodiments, the cluster master 180 of the fourth worker node 170, the master service of other worker nodes such as the master service 166 of the first worker node 114, and/or the cluster master controller 178 of the control server 176 may track the status of the worker nodes, which may be used as the health status information of the worker nodes. These components may exchange operation status information, utilize heartbeats to determine whether a worker node is operational, and/or utilize various other mechanisms to determine the statuses (operational states) of the worker nodes. In some embodiments, the distributed control plane 128 may utilize the polling thread 901 to identify the statuses of the worker nodes and/or identify object ownership changes of objects amongst the work nodes such as due to worker nodes failing.

In some embodiments, the distributed storage architecture 112 may tracking the health status information of the worker nodes, and provide the health status information to the distributed control plane 128. In some embodiments, the distributed storage architecture 112 may utilize the health status information to detect a failure of a worker node (or an underperforming worker node). The distributed storage architecture 112 may transfer ownership of at least some objects owned by the worker node if the worker node is underperforming in order to reduce load on the worker node. The distributed storage architecture 112 may transfer ownership of all objects owned by the worker node to other worker nodes (to existing worker nodes or newly created worker nodes to replace the failed worker node) based upon the worker node failing. The distributed storage architecture 112 may replace the worker node with one or more new worker nodes based upon the work node failing. The distributed storage architecture 112 may remove the failed worker node.

Information relating to a worker node failing, a worker node being replaced by a new worker node, a worker node being removed, and/or ownership of objects being transferred from a failed worker node to a new or existing worker node may be provided to the distributed control plane 128. The distributed control plane 128 may implement various actions based upon this information. In some embodiments, the distributed control plane 128 may determine that the distributed storage architecture 112 removed a worker node such as due to the worker node failing. Accordingly, the distributed control plane 128 may remove a control plane controller that was paired with the worker node and/or may remove a pod hosting the control plane controller if the pod is no longer being used. In some embodiments, the distributed control plane 128 may determine that the distributed storage architecture 112 added a new worker node such as to replace a failed worker node. The distributed control plane 128 may remove a control plane controller that was paired with the failed worker node and/or may remove a pod hosting the control plane controller if the pod is no longer being used. The distributed control plane 128 may create and pair a new control plane controller with the new worker node. Or instead of removing the control plane controller, the distributed control plane 128 may change (reassign) the control plane controller from being paired with the failed worker node to being paired with the new worker node.

The distributed control plane 128 may receive a command to perform a control plane operation associated with an object stored within the distributed storage architecture 112, during operation 1002 of method 1000. The distributed control plane 128 may identify a worker node as an owner of the object targeted by the command. During operation 1004 of method 1000, the distributed control plane 128 may determine whether the worker node owning the object targeted by the command has failed. If the worker node has not failed, then the command is routed to a control plane controller paired with the worker node owning the object, during operation 1006 of method 1000. During operation 1008 of method 1000, the control plane controller may reformat the command according to an imperative model supported by the distributed storage architecture 112 as a reformatted command. During operation 1010 of method 1000, the control plane controller may transmit the reformatted command to an API endpoint of the worker node for performing the control plane operation.

If the worker node has failed, then ownership of the object is transferred to a replacement worker node, during operation 1012 of method 1000. The object may be transferred to an existing worker node or a newly created worker node to replace the failed worker node as the replacement worker node. If the replacement worker node is not currently paired with a control plane controller such as because the replacement worker node is a new worker node, then a control plane controller is paired with the replacement worker node, during operation 1014 of method 1000. If the replacement worker node is already paired with a control plane controller, then the distributed control plane 128 identifies the control plane controller paired with the replacement worker node. During operation 1016 of method 1000, the command is routed to the control plane controller paired with the replacement worker node. During operation 1018, the control plane controller reformats and transmits the command as a reformatted command to an API endpoint of the replacement worker node for performing the control plane operation.

Figure 11A:
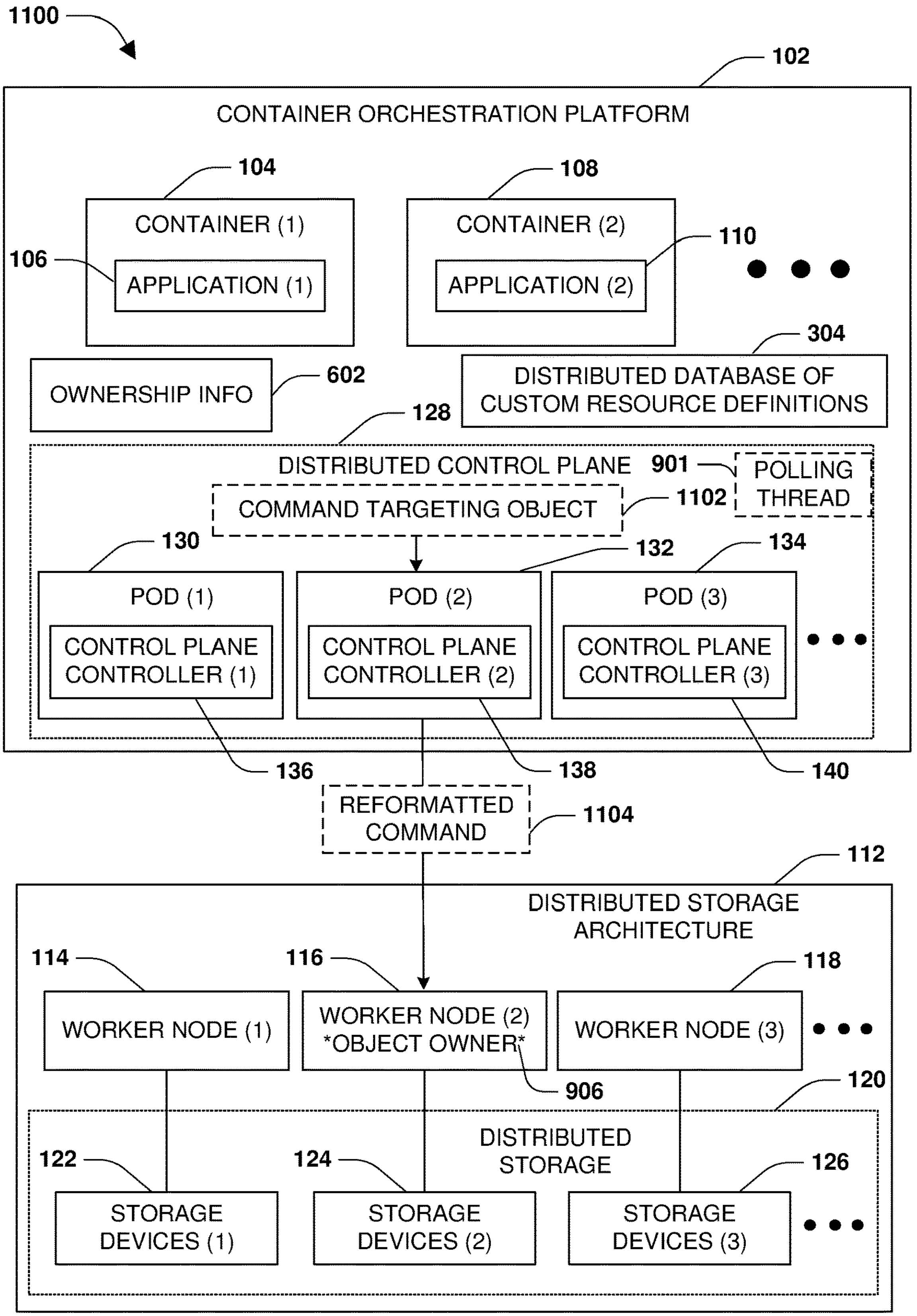
FIGS. 11A-11D are block diagrams illustrating an example of routing commands to control plane controllers paired with worker nodes based upon whether the worker nodes are operational or have failed in accordance with an embodiment of the present technology.

FIG. 11A is a block diagram illustrating an example of routing commands to control plane controllers paired with worker nodes based upon whether the worker nodes are operational or have failed in accordance with an embodiment of the present technology. The distributed control plane 128 may receive a command 1102 from an application hosted within the container orchestration platform 102. In some embodiments, the command 1102 may be formatted according to a declarative model as attributes specified through a custom resource specification of a custom resource definition within the distributed database 304 of the container orchestration platform 102. The distributed control plane 128 may utilize a polling thread 901 to determine ownership information 602 of an object targeted by the command 1102. The ownership information 602 may indicate that the second worker node 116 is a current owner of the object targeted by the command 1102. The distributed control plane 128 may evaluate health status information of the second worker node 116 to determine whether the second worker node 116 is operational (available to perform the command 1102) or has failed. In response to determining that the second worker node 116 is operational, the distributed control plane 128 may route the command 1102 to the second control plane controller 138 paired with the second worker node 116. The second control plane controller 138 may reformat the command 1102 to create a reformatted command 1104 formatted according to the imperative model supported by the second worker node 116. The second control plane controller 138 transmits the reformatted command 1104 to the second worker node 116 to execute.

Figure 11B:
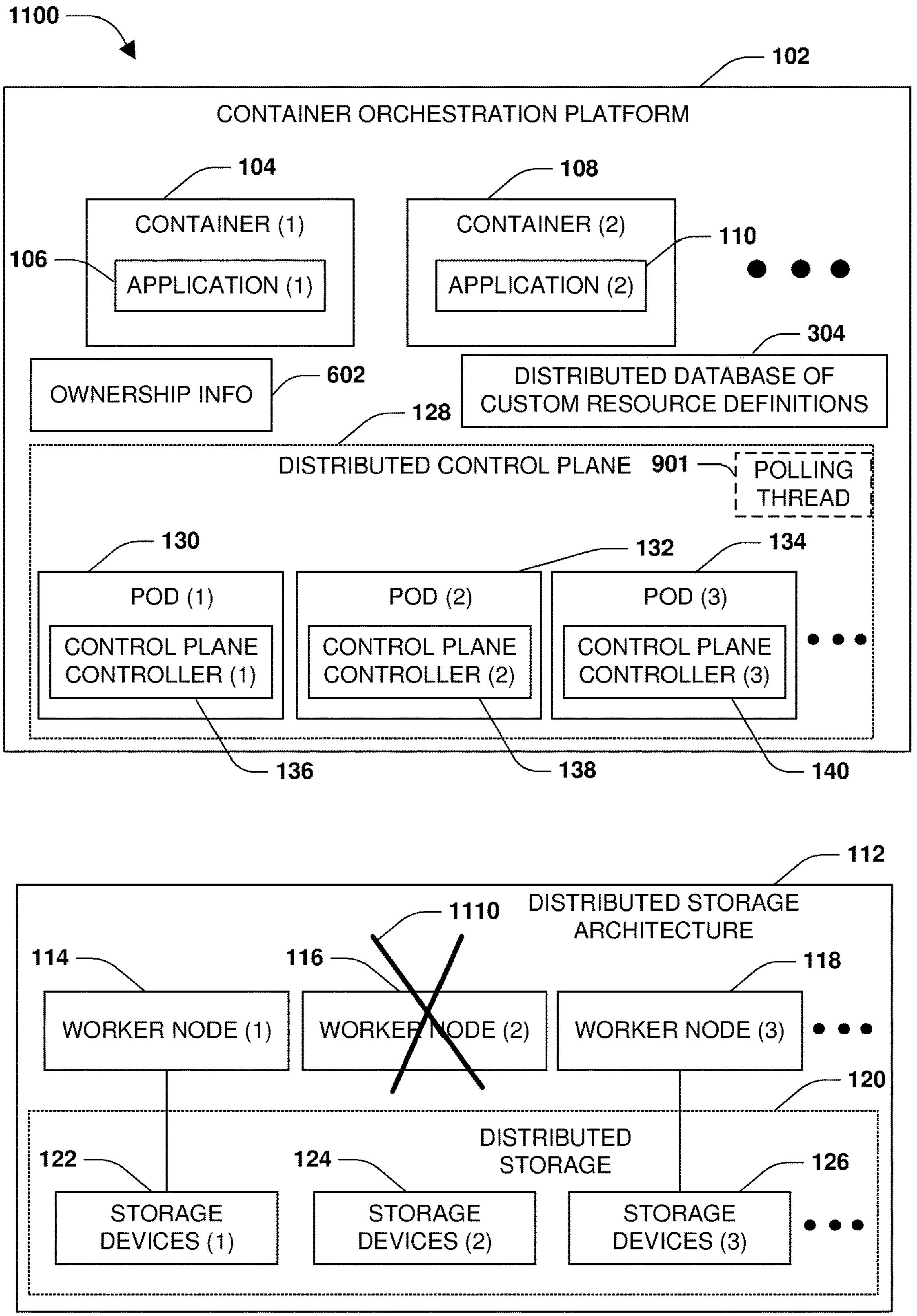

FIG. 11B is a block diagram illustrating an example of routing commands to control plane controllers paired with worker nodes based upon whether the worker nodes are operational or have failed in accordance with an embodiment of the present technology. The distributed control plane 128 may determine that the second worker node 116 has failed 1110. In some embodiments, the distributed control plane 128 may receive a notification from the distributed storage architecture 112 that the second worker node 116 failed 1110. In some embodiments, the distributed control plane 128 may detect the failure 1110 such as through a loss of a heartbeat shared by the second worker node 116. In some embodiments, the distributed control plane 128 may evaluate health status information to determine that the second worker node 116 failed 1110.

Figure 11C:
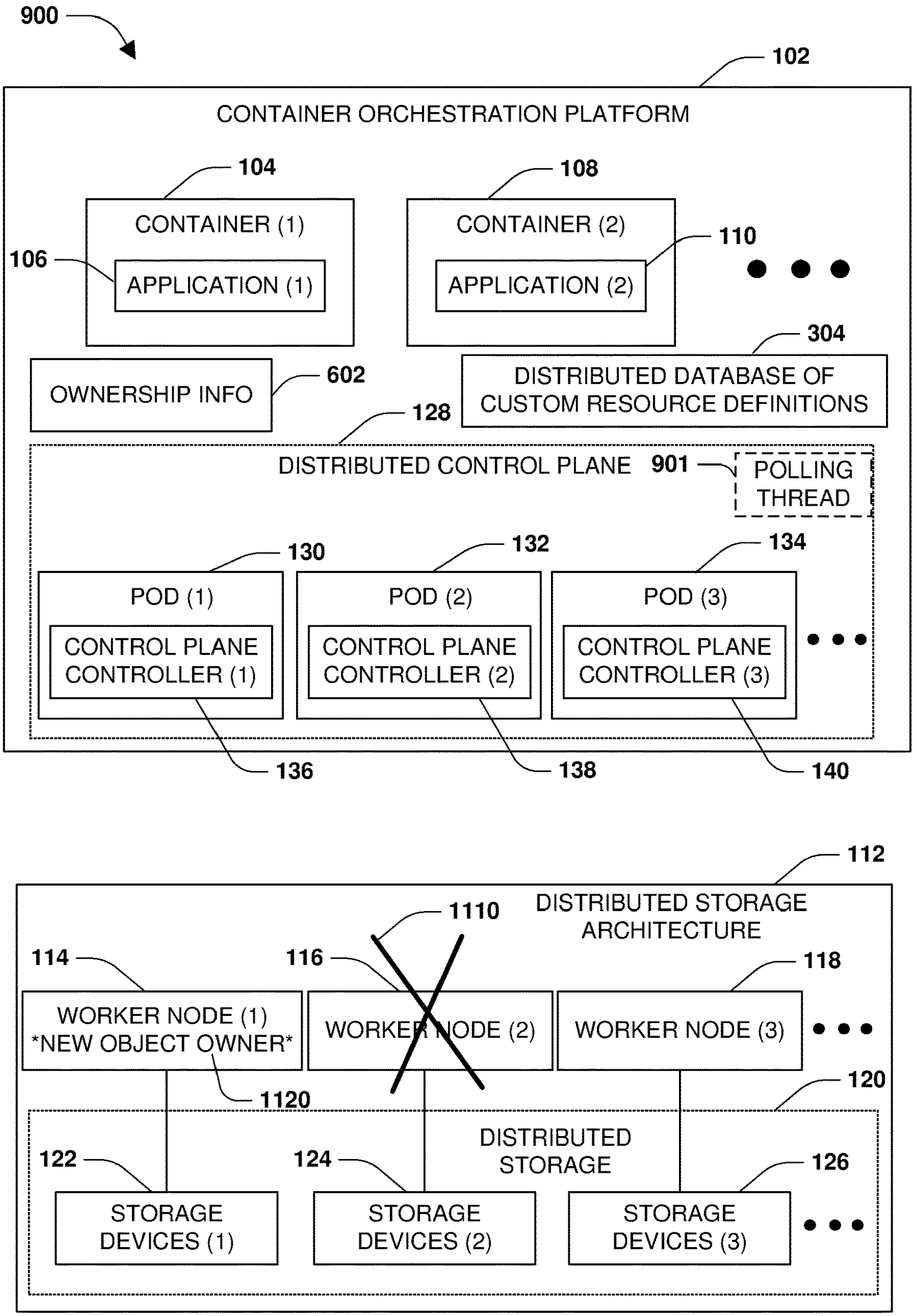

FIG. 11C is a block diagram illustrating an example of routing commands to control plane controllers paired with worker nodes based upon whether the worker nodes are operational or have failed in accordance with an embodiment of the present technology. The distributed storage architecture 112 may reassign ownership of the object from the failed second worker node 116 to the first worker node 114 as a new object owner 1120 of the object. The reassignment of the object to the first owner node 114 as the new object owner 1120 of the object may be reflected within the ownership information 602 such as where an entry for the object is updated with an identifier or name of the first worker node 114 as the new object owner 1120 of the object.

Figure 11D:
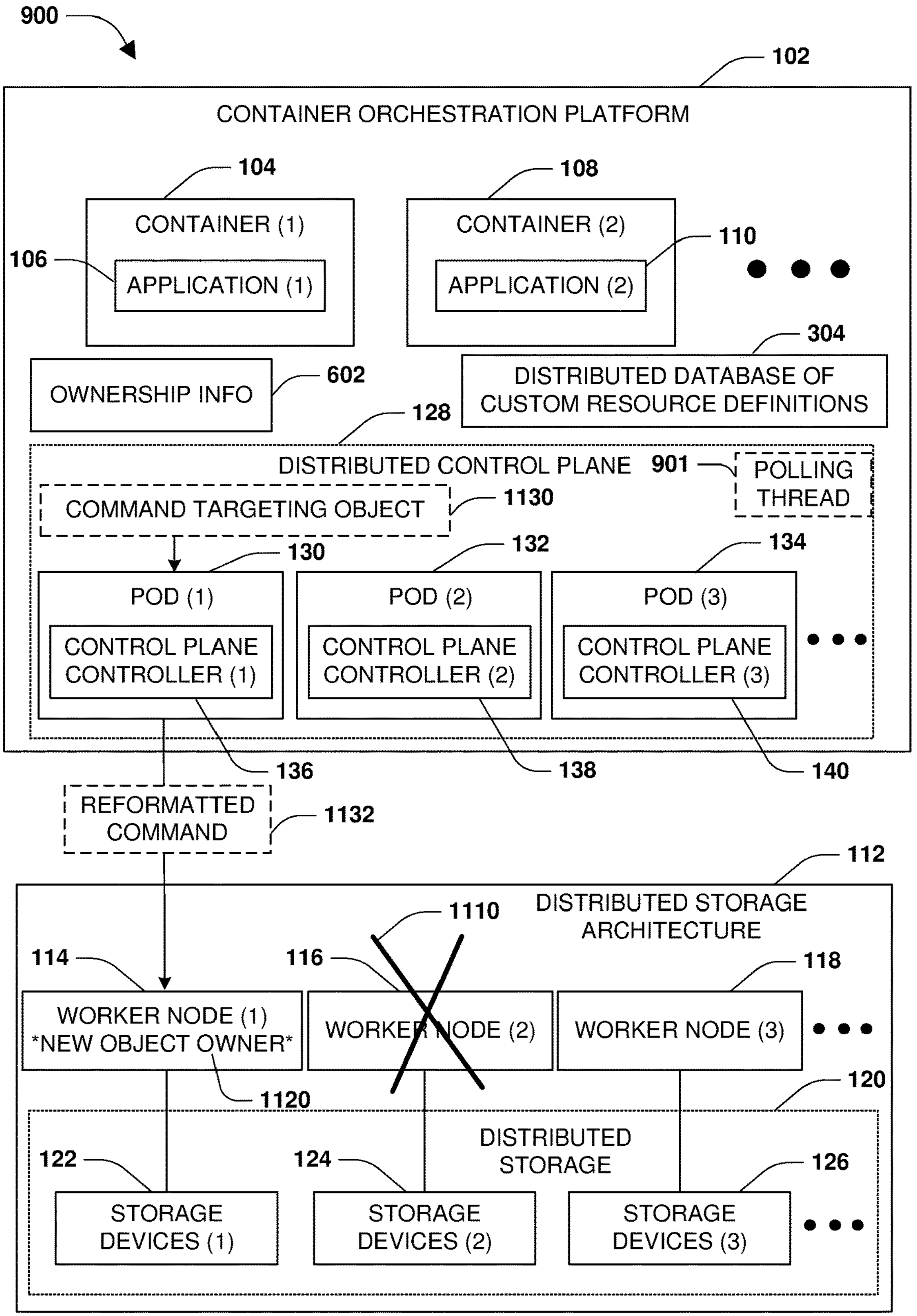

FIG. 11D is a block diagram illustrating an example of routing commands to control plane controllers paired with worker nodes based upon whether the worker nodes are operational or have failed in accordance with an embodiment of the present technology. The distributed control plane 128 may receive a subsequent command 1130 from an application hosted within the container orchestration platform 102. In some embodiments, the subsequent command 1130 may be formatted according to the declarative model as attributes specified through the custom resource specification of the custom resource definition within the distributed database 304 of the container orchestration platform 102 for the object. The subsequent command 1130 may target the same object that was targeted by the command 1102 before the failure 1110 of the second worker node 116. The subsequent command 1130 may be received after the second worker node 116 failed 1110 and after ownership of the object was reassigned to the first worker node 114.

The distributed control plane 128 may utilize the polling thread 901 to determine ownership information 602 of the object targeted by the subsequent command 1130. The ownership information 602 may indicate that the first worker node 114 is a current owner of the object targeted by the subsequent command 1130. The distributed control plane 128 may evaluate health status information of the first worker node 114 to determine whether the first worker node 114 is operational (available to perform the subsequent command 1130) or has failed. In response to determining that the first worker node 114 is operational, the distributed control plane 128 may route the subsequent command 1130 to the first control plane controller 136 paired with the first worker node 114. The first control plane controller 136 may reformatted the subsequent command 1130 to create a reformatted subsequent command 1132 formatted according to the imperative model supported by the first worker node 114. The first control plane controller 136 transmits the reformatted subsequent command 1132 to the first worker node 114 to execute.

Figure 12:
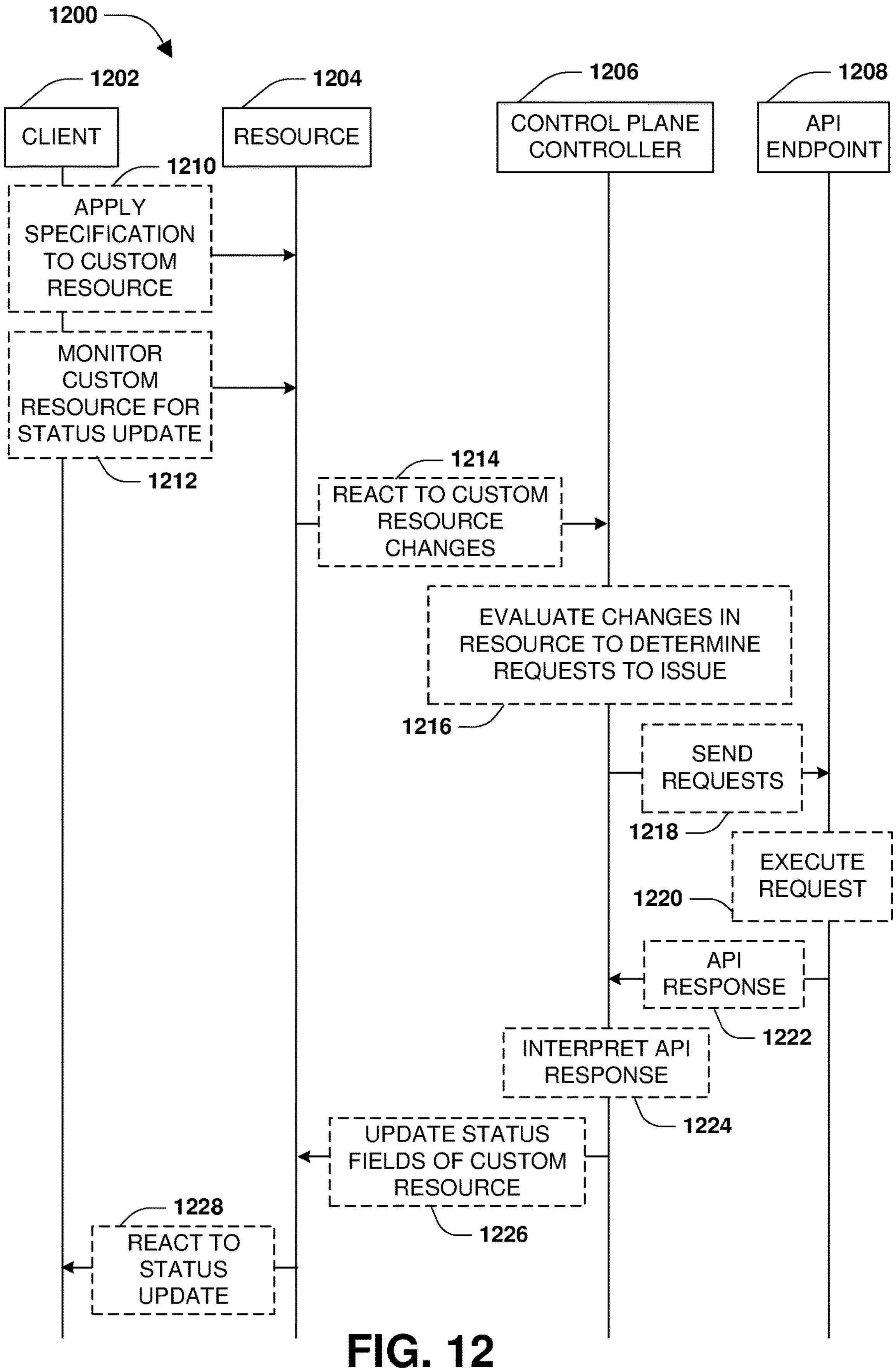
FIG. 12 is a sequence diagram illustrating operation of a control plane controller in accordance with an embodiment of the present technology.

FIG. 12 is a sequence diagram illustrating operation of a control plane controller in accordance with an embodiment of the present technology. During operation 1210, a client 1202 may generate and apply a specification to a custom resource 1204. The specification may specify values for parameters of the custom resource 1204, such as a size of a volume custom resource, a name of the volume custom resource, etc. During operation 1212, the client 1202 monitors the custom resource 1204 for a status update regarding implementation of the specification applied to the custom resource 1204. During operation 1214, a control plane controller 1206 monitors the custom resource 1204 and reacts to the custom resource changes that occurred from the client 1202 applying the specification to the custom resource 1204. In some embodiments, the custom resource 1204 is a resource that the control plane controller 1206 reconciles and is node scoped/specific, and thus the control plane controller 1206 may be run as a DaemonSet (e.g., a Kubernetes DaemonSet that manages pods and ensures that pods are scheduled and running on nodes). The ownership of custom resources can change amongst nodes. Accordingly, the control plane controller 1206 implements logic that follows a common pattern of first deciding if this specific pod associated with the control plane controller 1206 should reconcile the custom resource 1204 or not based upon whether the pod is paired with a node currently owning the custom resource 1204.

If the pod is paired with the node currently owning the custom resource 1204, then operation 1216 is performed. During operation 1216, the control plane controller 1206 evaluates the changes made to the custom resource 1204 by the specification in order to determine what requests to issue to an API endpoint 1208 of the node currently owning the custom resource 1204 (e.g., a modify volume size request may be issued based upon the specification modifying a size of a volume custom resource). During operation 1218, the control plane controller 1206 sends the requests to the API endpoint 1208 of the node currently owning the custom resource 1204. During operation 1220, the node executes the request (e.g., modifies the size of the volume custom resource). During operation 1222, the node sends an API response through the API endpoint 1208 to the control plane controller 1206. During operation 1224, the control plane controller 1206 interprets the API response to identify any custom resource modifications that were performed by the node when executing the request. During operation 1226, the control plane controller 1206 updates status fields of the custom resource 1204 based upon the interpreted API response. During operation 1228, the client 1202 identifies and/or reacts to the status updates within the custom resource 1204 being monitored by the client 1202 for updates (e.g., reacts to the size of the custom resource volume being increased such as by executing an operation that otherwise could not be executed if the size was not increased).

Figure 13:
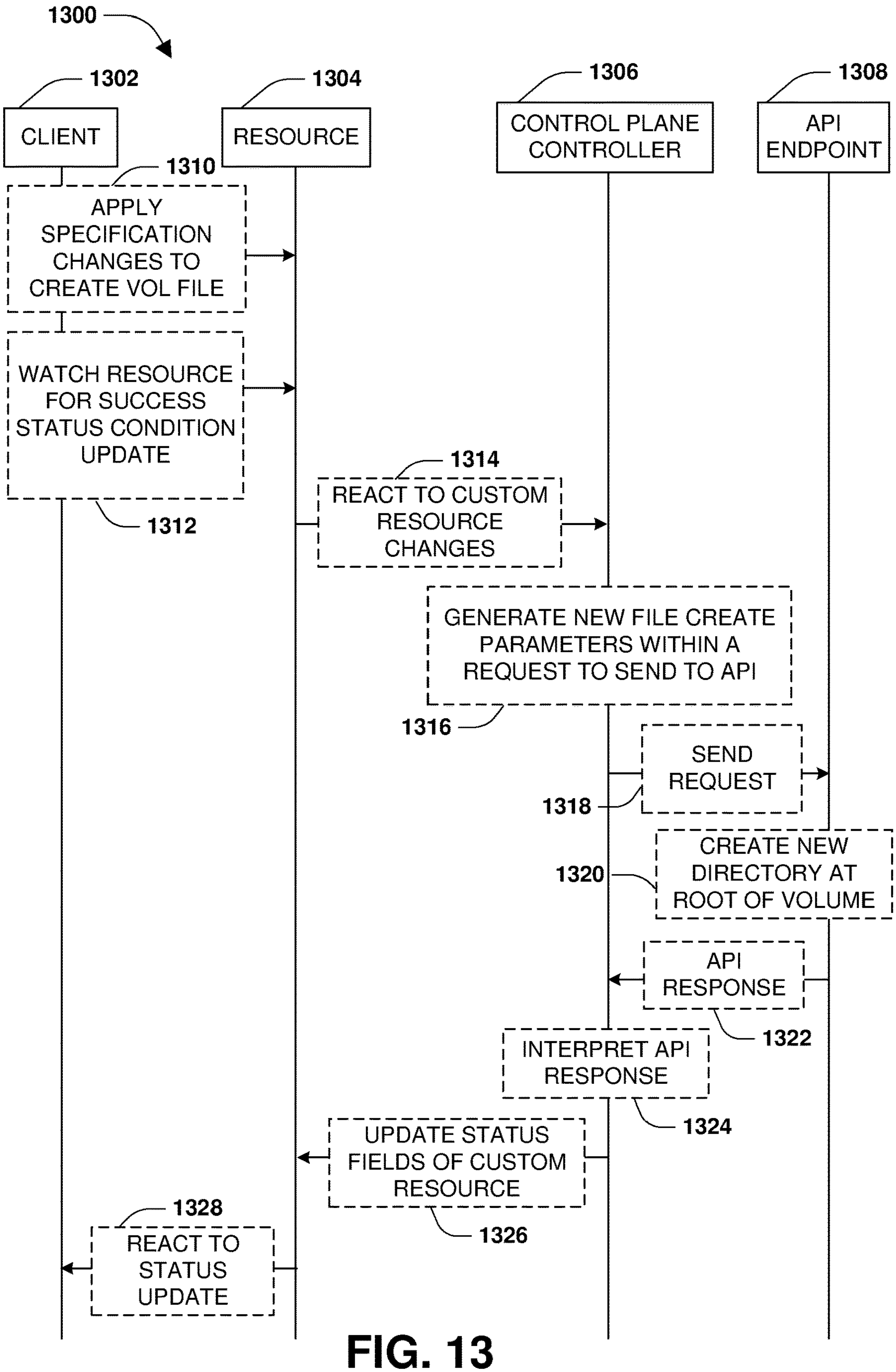
FIG. 13 is a sequence diagram illustrating operation of a control plane controller facilitating the creation a volume file in accordance with an embodiment of the present technology.

FIG. 13 is a sequence diagram illustrating operation of a control plane controller facilitating the creation a volume file in accordance with an embodiment of the present technology. During operation 1310, a client 1302 may generate and apply a specification to a custom resource 1304 to create a volume file (a directory /dir1). The specification may specify values for parameters for the volume file to create, such as a path (e.g., path:/dir1) and a type (e.g., type:/directory). During operation 1312, the client 1302 monitors the custom resource 1304 for a status update regarding implementation of the specification applied to the custom resource 1304, such as a file operation success status condition update. During operation 1314, a control plane controller 1306 monitors the custom resource 1304 and reacts to the custom resource changes that occurred from the client 1302 applying the specification to the custom resource 1304. In some embodiments, the custom resource 1304 is a resource that the control plane controller 1306 reconciles and is node scoped/specific, and thus the control plane controller 1306 may be run as a DaemonSet (e.g., a Kubernetes DaemonSet that manages pods and ensures that pods are scheduled and running on nodes). The ownership of custom resources can change amongst nodes. Accordingly, the control plane controller 1306 implements logic that follows a common pattern of first deciding if this specific pod associated with the control plane controller 1306 should reconcile the custom resource 1304 or not based upon whether the pod is paired with a node currently owning the custom resource 1304.

If the pod is paired with the node currently owning the custom resource 1304 and determines that the volume file exists within the specification file collection (spec.files collection) and does not exist within a status files collection (status.files collection) associated with already created volume files, then operation 1316 is performed. During operation 1316, the control plane controller 1306 creates a new file create parameters object to send through a request to the API endpoint 1308 of the node currently owning the custom resource 1304. The new file create parameters object may comprise a volume UUID, the path specified by the specification (e.g., path:/dir1), and the type specified by the specification (e.g., type:/directory). During operation 1318, the control plane controller 1306 sends the requests to the API endpoint 1308 of the node currently owning the custom resource 1304. During operation 1320, the node executes the request by creating the new directory /dir1 at a root of the volume identified by the UUID. During operation 1322, the node sends an API response through the API endpoint 1308 to the control plane controller 1306. During operation 1324, the control plane controller 1306 interprets the API response to determine that the volume file (the directory /dir) was successfully recreated. The control plane controller 1306 updates the status files collection to indicate that the volume file (the directory /dir1) was created. The control plane controller 1306 also updates a file operation success status condition to indicate that all attempted requests were successful. During operation 1326, the control plane controller 1306 updates status fields of the custom resource 1304 based upon the interpreted API response. During operation 1328, the client 1302 identifies and/or reacts to the status updates within the custom resource 1304 being monitored by the client 1302 for updates, such as by accessing the new volume file (the directory /dir1).

Figure 14:
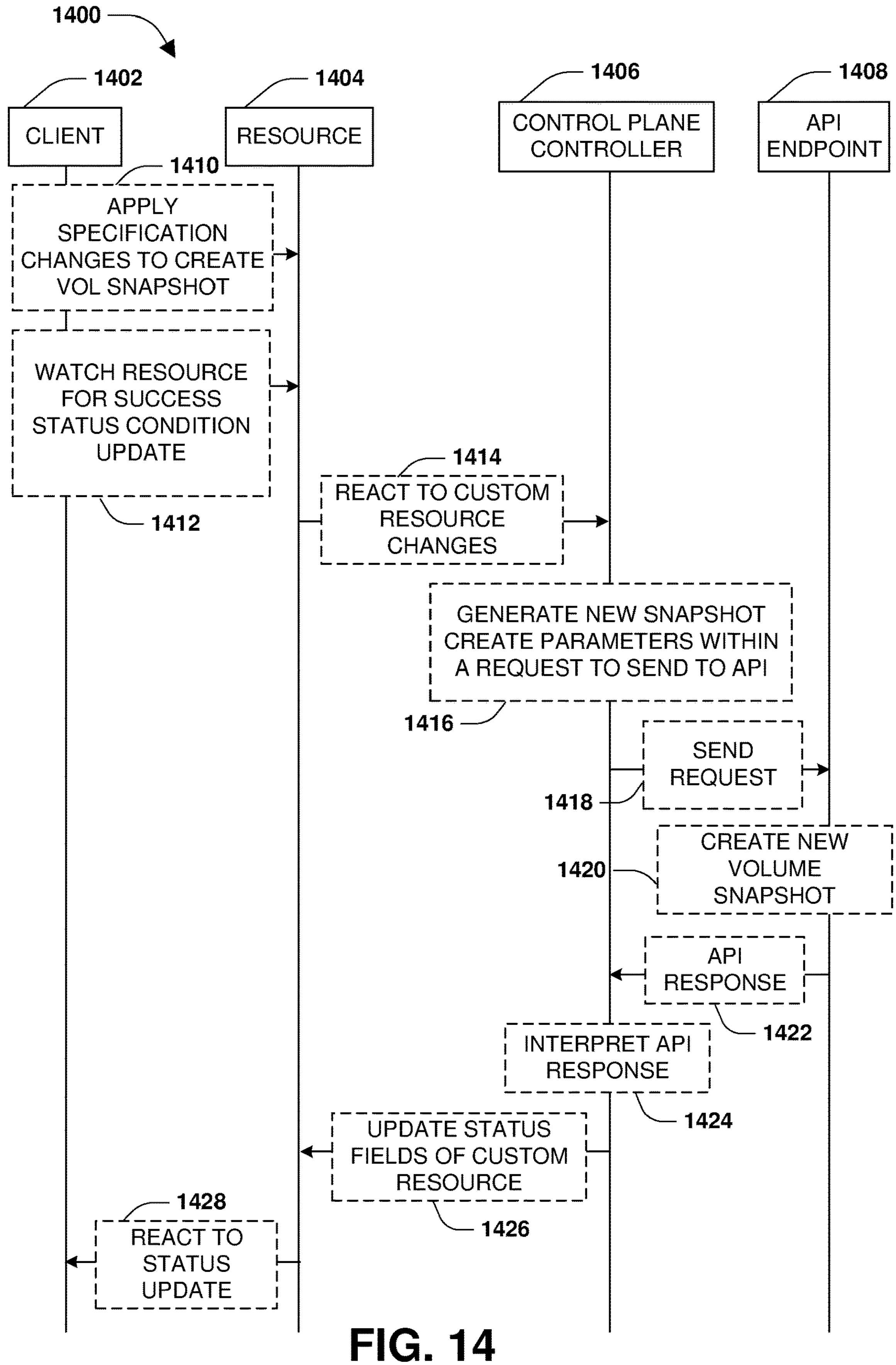
FIG. 14 is a sequence diagram illustrating operation of a control plane controller facilitating the creation of a volume snapshot in accordance with an embodiment of the present technology.

FIG. 14 is a sequence diagram illustrating operation of a control plane controller facilitating the creation of a volume snapshot in accordance with an embodiment of the present technology. During operation 1410, a client 1402 may generate and apply a specification to a custom resource 1404 to create a volume snapshot. The specification may specify values for parameters for the volume snapshot to create, such as a snapshot name, a volume name of the volume for which the snapshot is being created, and a cluster identifier of a cluster owning the volume. During operation 1412, the client 1402 monitors the custom resource 1404 for a status update regarding implementation of the specification applied to the custom resource 1404, such as a snapshot create success status condition update. During operation 1414, a control plane controller 1406 monitors the custom resource 1404 and reacts to the custom resource changes that occurred from the client 1402 applying the specification to the custom resource 1404. In some embodiments, the custom resource 1404 is a resource that the control plane controller 1406 reconciles and is node scoped/specific, and thus the control plane controller 1406 may be run as a DaemonSet (e.g., a Kubernetes DaemonSet that manages pods and ensures that pods are scheduled and running on nodes). The ownership of custom resources can change amongst nodes. Accordingly, the control plane controller 1406 implements logic that follows a common pattern of first deciding if this specific pod associated with the control plane controller 1406 should reconcile the custom resource 1404 or not based upon whether the pod is paired with a node currently owning the custom resource 1404. If the volume does not exist at the node, then the node does not currently own the volume and a different control plane controller paired with a different node actually owning the volume will instead handle the creation of the snapshot.

If the pod is paired with the node currently owning the custom resource 1404 (the volume being snapshotted), then operation 1416 is performed. During operation 1416, the control plane controller 1406 creates a new snapshot create parameters object to send through a request to the API endpoint 1408 of the node currently owning the custom resource 1404. The new snapshot create parameters object may comprise a volume UUID of the volume and the snapshot name from the specification. During operation 1418, the control plane controller 1406 sends the requests to the API endpoint 1408 of the node currently owning the custom resource 1404. During operation 1420, the node executes the request by creating a new volume snapshot of the volume at a root of the volume within a .snap directory and having the snapshot name. During operation 1422, the node sends an API response through the API endpoint 1408 to the control plane controller 1406. During operation 1424, the control plane controller 1406 interprets the API response to determine that the volume snapshot was successfully created. The control plane controller 1306 updates a creation time status of the volume snapshot, a ready to use status, and a restore size (e.g., a size needed to perform a restore operation using the volume snapshot) to reflect attributes of the newly created volume snapshot. The control plane controller 1406 also updates a snapshot created success status condition to indicate that the attempted snapshot creation operation was successful. During operation 1426, the control plane controller 1406 updates status fields of the custom resource 1404 based upon the interpreted API response. During operation 1428, the client 1402 identifies and/or reacts to the status updates within the custom resource 1404 being monitored by the client 1402 for updates.

Figure 15:
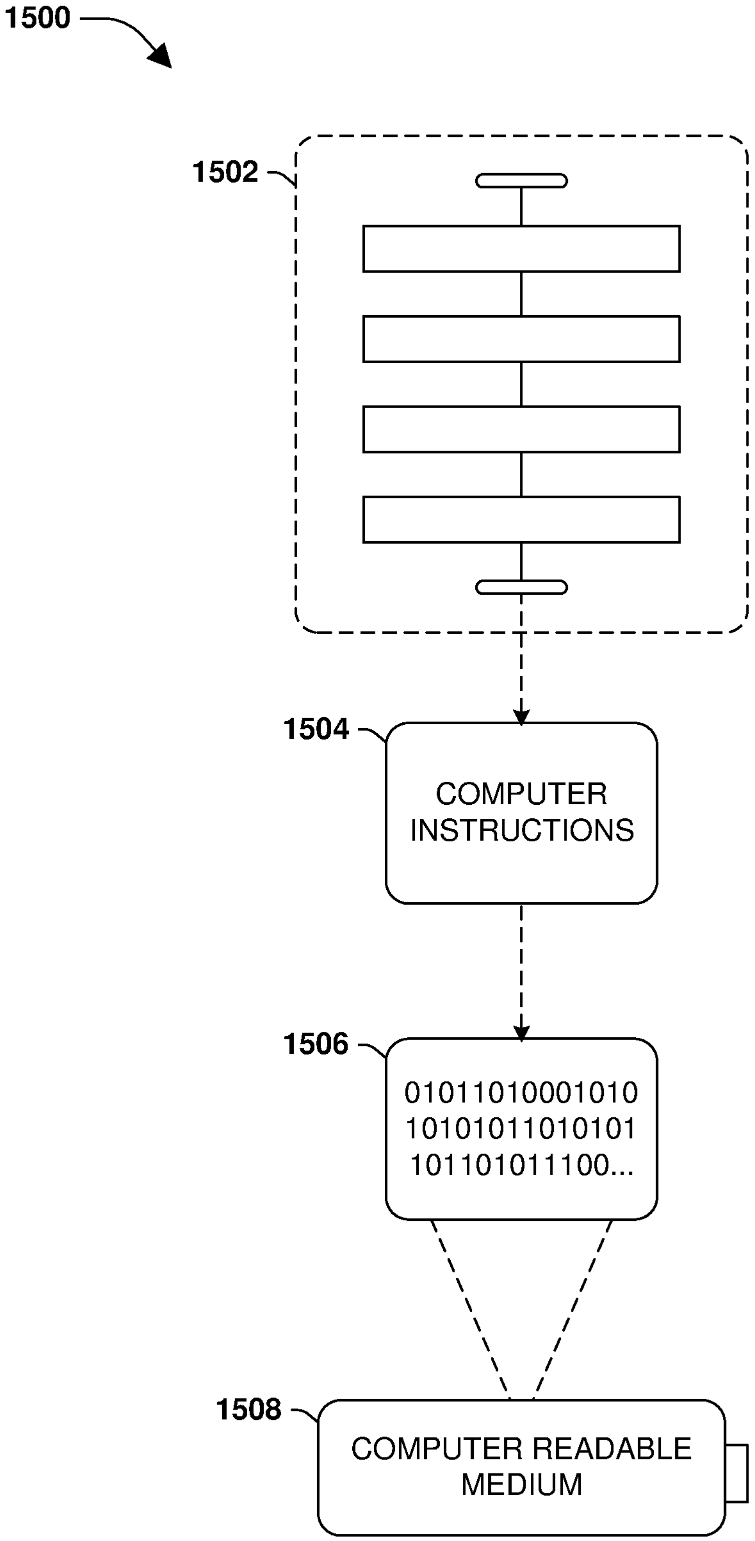
FIG. 15 is an example of a computer readable medium in which various embodiments of the present technology may be implemented.

FIG. 15 is an example of a computer readable medium in which various embodiments of the present technology may be implemented. An example embodiment of a computer-readable medium or a computer-readable device that is devised in these ways is illustrated in FIG. 15, wherein the implementation comprises a computer-readable medium 1508, such as a compact disc-recordable (CD-R), a digital versatile disc-recordable (DVD-R), flash drive, a platter of a hard disk drive, etc., on which is encoded computer-readable data 1506. This computer-readable data 1506, such as binary data comprising at least one of a zero or a one, in turn comprises processor-executable computer instructions 1504 configured to operate according to one or more of the principles set forth herein. In some embodiments, the processor-executable computer instructions 1504 are configured to perform at least some of the exemplary methods 1502 disclosed herein, such as method 200 of FIG. 2, method 500 of FIG. 5, method 700 of FIG. 7, method 800 of FIG. 8, and/or method 1000 of FIG. 10, for example. In some embodiments, the processor-executable computer instructions 1504 are configured to implement a system, such as at least some of the exemplary systems disclosed herein, such as system 100 of FIGS. 1A-1C, system 300 of FIG. 3, system 600 of FIG. 6, system 900 of FIGS. 9A and 9B, and/or system 1100 of FIGS. 11A-11D, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:

a distributed storage architecture including a plurality of worker nodes executed by one or more processors that managing distributed storage comprised of storage devices hosted by the plurality of worker nodes;

a container orchestration platform hosting applications running through containers using instructions stored in memory and executed by the one or more processors of the system and hosting a distributed control plane, wherein the distributed control plane executed by the one or more processors hosts a plurality of pods each hosting a respective control plane controller that is paired with a respective worker node of the plurality of worker nodes;

the distributed control plane that in response to identifying a custom resource definition created by an application within the container orchestration platform according to a declarative model, extracts attributes defined for an object from the custom resource definition, wherein the custom resource definition excludes executable steps for creating the object;

a control plane controller executed by the one or more processors paired with a worker node that is an owner of the object that:

executes functionality to convert the attributes defined for the object according to the declarative model through the custom resource definition into a sequence of executable steps for creating the object with the attributes as a control plane operation, wherein the sequence of executable steps are formatted according to an imperative model capable of being executed by the paired worker node through the distributed storage architecture; and transmits the sequence of executable steps as a reformatted command to the paired worker node for controlling the paired worker node to execute the sequence of executable steps to provision the object with the attributes;

the paired worker node that:

executes the sequence of executable steps as programming commands to transition between programming states for provisioning the object within the distributed storage; and provisions the object with the attributes within the distributed storage of the distributed storage architecture for use by the application running within container.

2. The system of claim 1, wherein the control plane controller is further configured to:

receive a response from the paired worker node regarding implementation of the control plane operation for the object;

identify the custom resource definition maintained within the container orchestration platform for the object;

populate a status field within the custom resource definition with information extracted from the response; and provide the application with access to the information within the status field of the customer resource definition for tracking progress of the implementation of the control plane operation.

3. The system of claim 1, wherein the control plane controller is further configured to:

receive state information of the object from the paired worker node regarding implementation of the control plane operation for the object; and populate an event field, within the custom resource definition maintained within the container orchestration platform for the object, with the state information, wherein the application is provided with access to the custom resource definition.

4. The system of claim 1, wherein the control plane controller is further configured to:

monitor a distributed database within which custom resource definitions are maintained by the container orchestration platform for objects stored within the distributed storage of the distributed storage architecture; and in response to identifying a new custom resource definition within the distributed database for creating a new object, trigger the generation and transmission of a representational state transfer (REST) application programming interface (API) call to a REST API endpoint of the paired worker node to create the new object within the distributed storage.

5. The system of claim 1, wherein the control plane controller is further configured to:

monitor the custom resource definition maintained in a distributed database maintained by the container orchestration platform for the object stored within the distributed storage of the distributed storage architecture; and in response to identifying a change to the custom resource definition, trigger the generation and transmission of a representational state transfer (REST) application programming interface (API) call to a REST API endpoint of the paired worker node to implement the change upon the object.

6. The system of claim 1, the distributed control plane is configured to:

identify an export policy custom resource definition for an export policy and a volume custom resource definition associated with a provision command to provision a volume for access by the application based upon the export policy;

create a storage provisioning representational state transfer (REST) application programming interface (API) call based upon the export policy custom resource definition and the volume custom resource definition, wherein the storage provisioning REST API call is formatted according to the imperative model; and transmit the storage provisioning REST API call to a REST API endpoint of the paired worker node to provision the volume and utilize the export policy to make the volume accessible to the application to mount.

7. The system of claim 1, the distributed control plane is further configured to:

determine that a command received from the application is a snapshot create command to create a snapshot of a volume; and in response to identifying the paired worker node as a current owner of the volume, route the command to the control plane controller paired with the paired worker node, wherein the paired worker node creates the snapshot and is designated as an owner of the snapshot.

8. The system of claim 1, wherein the distributed control plane is further configured to:

in response to identifying the paired worker node as a current owner of a file targeted by a file operation command received from the application, route the file operation command to the control plane controller paired with the paired worker node for execution of the file operation command.

9. The system of claim 1, wherein the control plane controller is further configured to:

include a security certificate and credentials within a representational state transfer (REST) application programming interface (API) call for authenticating with the paired worker node to implement the control plane operation.

10. A method, comprising:

retrieving, by a distributed control plane hosted within a container orchestration platform hosting applications running through containers, a custom resource definition for an object to create within distributed storage comprised of storage devices hosted by a plurality of worker nodes of a distributed storage architecture, wherein the distributed control plane executed by one or more processors hosts a plurality of pods each hosting a respective control plane controller that is paired with a respective worker node of the plurality of worker nodes;

evaluating, by the distributed control plane, ownership of objects by the plurality of worker nodes to identify a worker node that is to be an owner of the object;

extracting, by the distributed control plane, attributes defined for the object from the custom resource definition, wherein the custom resource definition excludes executable steps for creating the object;

executing, by a control plane controller executed by the one or more processors paired with the identified worker node, functionality to convert the attributes defined for the object according to a declarative model through the custom resource definition into a sequence of executable steps for creating the object with the attributes as a control plane operation, wherein the sequence of executable steps are formatted according to an imperative model capable of being executed by the identified worker node through the distributed storage architecture;

transmitting, by the control plane controller, the sequence of executable steps as a reformatted command to the identified worker node for controlling the identified worker node to execute the executable steps to provision the object with the attributes;

executing, by the identified worker node that is executed by the one or more processors, the executable steps as programming commands to transition between programming states for provisioning the object within the distributed storage; and provisioning the object, with the attributes, within the distributed storage of the distributed storage architecture for use by the application running within a container.

11. The method of claim 10, further comprising:

populating an event field within the custom resource definition maintained within the container orchestration platform for the object with warning information received from the identified worker node regarding implementation of the reformatted command, wherein the application is provided with access to the custom resource definition.

12. The method of claim 10, further comprising:

populating the custom resource definition, maintained within the container orchestration platform for the object, with information extracted from a response received from the identified worker node regarding implementation of the reformatted command, wherein the application is provided with access to the custom resource definition for reading the information.

13. The method of claim 10, further comprising:

generating and transmitting a create object representational state transfer (REST) application programming interface (API) call to a REST API endpoint of the identified worker node to create a new object within the distributed storage based upon a determination that a new custom resource definition for creating the new object is available within the container orchestration platform.

14. The method of claim 10, further comprising:

interacting, by the control plane controller, with the applications running through containers of the container orchestration platform using custom resource definitions corresponding to at least one of a cluster custom resource definition, a volume custom resource definition, an export policy custom resource definition, a snapshot custom resource definition, or a cloud backup custom resource definition.

15. The method of claim 10, further comprising:

implementing, by the identified worker node, the reformatted command to create the object as a clone of a volume as a cloned volume accessible to one or more of the applications, wherein the identified worker node is designated as owning the clone.

16. The method of claim 10, further comprising:

extracting information from a custom resource specification to generate the reformatted command, wherein the information corresponds to a least one of volume information, cluster information, volume name information, export policy information, permissions information, quality of service policy information, or volume size information.

17. A non-transitory machine readable medium comprising instructions, which when executed by a machine comprising one or more processors, causes the machine to:

retrieve, by a distributed control plane hosted within a container orchestration platform hosting applications running through containers, a custom resource definition for an object to create within distributed storage comprised of storage devices hosted by a plurality of worker nodes of a distributed storage architecture, wherein the distributed control plane hosts a plurality of pods each hosting a respective control plane controller that is paired with a respective worker node of the plurality of worker nodes;

evaluate, by the distributed control plane, ownership of objects by the plurality of worker nodes to identify a worker node that is to be an owner of the object;

extract, by the distributed control plane, attributes defined for the object from the custom resource definition, wherein the custom resource definition excludes executable steps for creating the object;

execute, by a control plane controller paired with the identified worker node, functionality to convert the attributes defined for the object according to a declarative model through the custom resource definition into a sequence of executable steps for creating the object with the attributes as a control plane operation, wherein the sequence of executable steps are formatted according to an imperative model capable of being executed by the identified worker node through the distributed storage architecture;

transmit, by the control plane controller, the sequence of executable steps as a reformatted command to the identified worker node for controlling the identified worker node to execute the executable steps to provision the object with the attributes;

execute, by the identified worker node, the executable steps as programming commands to transition between programming states for provisioning the object within the distributed storage; and provision the object, with the attributes, within the distributed storage of the distributed storage architecture for use by the application running within a container.

18. The non-transitory machine readable medium of claim 17, wherein the instructions cause the machine to:

translate commands to at least one of creation or deletion of a cluster, addition or deletion of the worker node, or addition or deletion of storage as reformatted commands routed to the worker node.

19. The non-transitory machine readable medium of claim 17, wherein the instructions cause the machine to:

implement the control plane controller as a plug-in within the container orchestration platform, wherein the plug-in is provided with access to the identified worker node through a representational state transfer (REST) application programming interface (API) endpoint.

20. The non-transitory machine readable medium of claim 17, wherein the instructions cause the machine to:

create and monitor, by the control plane controller, a job executed by the identified worker node for implementing the reformatted command, wherein progress of the job is populated with the custom resource definition accessible by the application.

* * * * *